United States Patent
Chai

(10) Patent No.: US 11,457,337 B2
(45) Date of Patent: *Sep. 27, 2022

(54) SHORT MESSAGE SERVICE LINK FOR ACTIVITY FEED COMMUNICATIONS

(71) Applicant: Citrix Systems, Inc., Fort Lauderdale, FL (US)

(72) Inventor: Zheng Chai, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/206,222

(22) Filed: Mar. 19, 2021

(65) Prior Publication Data

US 2021/0297821 A1 Sep. 23, 2021

Related U.S. Application Data

(63) Continuation of application No. 16/837,093, filed on Apr. 1, 2020, now Pat. No. 10,986,473, which is a continuation of application No. PCT/CN2020/080227, filed on Mar. 19, 2020.

(51) Int. Cl.
*H04W 28/02* (2009.01)
*H04W 4/14* (2009.01)
*H04W 88/16* (2009.01)
*H04W 4/18* (2009.01)

(52) U.S. Cl.
CPC ............ *H04W 4/14* (2013.01); *H04W 4/18* (2013.01); *H04W 28/0257* (2013.01); *H04W 88/16* (2013.01)

(58) Field of Classification Search
CPC ..... H04W 4/14; H04W 4/18; H04W 28/0257; H04W 88/16; H04L 67/10
See application file for complete search history.

(56) References Cited

U.S. PATENT DOCUMENTS

| 10,986,473 B1 * | 4/2021 | Chai ................. H04W 4/18 |
| 2012/0110174 A1 * | 5/2012 | Wootton ............ H04L 63/1416 709/224 |
| 2016/0043988 A1 * | 2/2016 | Birch ................. H04W 4/14 709/206 |

FOREIGN PATENT DOCUMENTS

| CN | 1072547 A | 5/1993 |
| CN | 1994005 A | 4/2007 |
| CN | 1994005 A | 7/2007 |

(Continued)

OTHER PUBLICATIONS

First Office Action dated Aug. 31, 2021 for Chinese Patent Application No. 202080006685.4.

(Continued)

*Primary Examiner* — Joseph E Dean, Jr.
(74) *Attorney, Agent, or Firm* — Pierce Atwood LLP

(57) ABSTRACT

Disclosed, among other things, is a computing system that may translate a first message, which is indicative of a first event of a remote application, into a format communicable over a control channel of a cellular network, and may send the first message to a client device over the control channel. Also disclosed is client device that may translate a second message, which is indicative an action to be taken with respect to the remote application, into a format communicable over the control channel, and may send the second message to the computing system over the control channel.

20 Claims, 10 Drawing Sheets

(56) References Cited

FOREIGN PATENT DOCUMENTS

| CN | 101002495 A  | 7/2007 |
|----|--------------|--------|
| CN | 102056112 A  | 5/2011 |
| CN | 103650623 A  | 3/2014 |
| WO | 2013012759 A1 | 1/2013 |

OTHER PUBLICATIONS

International Search Report and Written Opinion dated Dec. 23, 2020 for International Patent Application No. PCT/CN2020/080227.

Panasonic Simultaneous Uu and PC5 link and SRB DRB mapping 3GPP TSG-RAN WG2 Meeting #91 R2-15326128, Aug. 2015, retrieved Jan. 12, 2021.

Examination Report dated Jun. 7, 2021 for Canadian Patent Application No. 2020356801.

\* cited by examiner

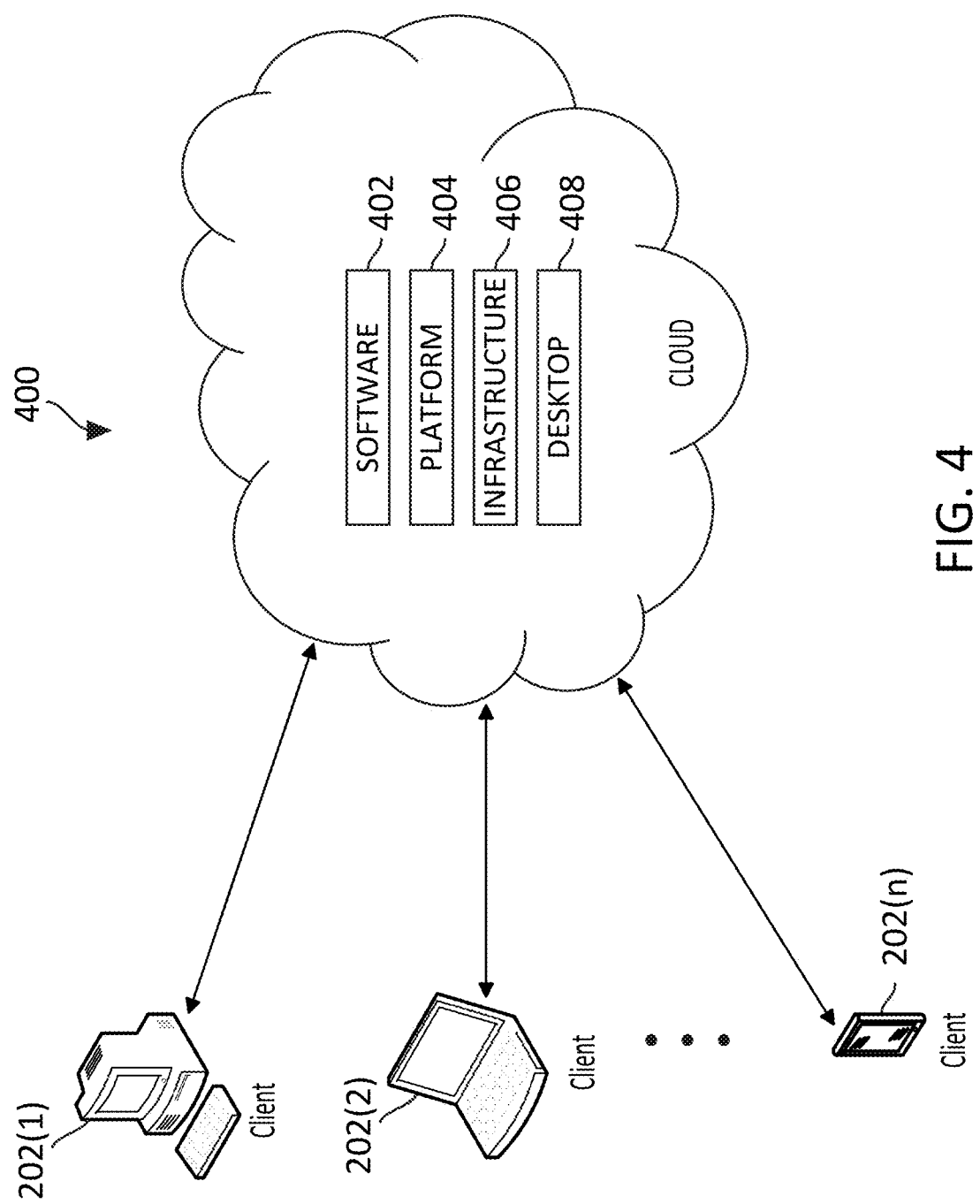

SHORT MESSAGE SERVICE LINK FOR ACTIVITY FEED COMMUNICATIONS

CROSS-REFERENCE TO RELATED APPLICATIONS

This application is a continuation of and claims the benefit under 35 U.S.C. § 120 to U.S. application Ser. No. 16/837,093, entitled SHORT MESSAGE SERVICE LINK FOR ACTIVITY FEED COMMUNICATIONS, filed Apr. 1, 2020, which is a continuation of and claims the benefit under 35 U.S.C. § 120 and 35 U.S.C. § 365(c) to International Application PCT/CN2020/080227, entitled SHORT MESSAGE SERVICE LINK FOR ACTIVITY FEED COMMUNICATIONS, with an international filing date of Mar. 19, 2020, the entire contents of each of which are incorporated herein by reference for all purposes.

BACKGROUND

Various systems have been developed that allow client devices to access applications and/or data files over a network. Certain products offered by Citrix Systems, Inc., of Fort Lauderdale, Fla., including the Citrix Workspace™ family of products, provide such capabilities. One feature of the Citrix Workspace™ is an intelligent activity feed for a user's many applications. Such an activity feed may provide a streamlined mechanism for notifying a user of various application events in need of attention and allowing the user to efficiently act on such events.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method involves determining, by a computing system, that a first message is to be sent to a client device, the first message being indicative of a first event of a remote application. The computing system determines to communicate the first message to the client device over a control channel of a cellular network based at least in part on (A) an inability to establish a traffic channel between the client device and the cellular network, or (B) one or more attributes of an established traffic channel between the client device and the cellular network. The computing system further translates the first message into a format communicable to the client device over the control channel, and sends the first message to the client device over the control channel.

In some disclosed embodiments, a method involves detecting, by a client device, a user input indicating an action that is to be taken with respect to a remote application. The client device determines that a first message is to be sent to a remote computing system, the first message indicating that the action is to be taken, and further determines to communicate the first message to the remote computing system over a control channel of a cellular network based at least in part on (A) an inability to establish a traffic channel between the client device and the cellular network, or (B) one or more attributes of an established traffic channel between the client device and the cellular network. The client device translates the first message into a format communicable to the remote computing system over the control channel, and sends the first message to the remote computing system over the control channel.

In some disclosed embodiments, a system includes at least one processor and at least one computer-readable medium. The at least one computer-readable medium is encoded with instructions which, when executed by the at least one processor, cause the system to determine that a first message is to be sent to a client device, the first message being indicative of a first event of a remote application; to determine to communicate the first message to the client device over a control channel of a cellular network based at least in part on (A) an inability to establish a traffic channel between the client device and the cellular network, or (B) one or more attributes of an established traffic channel between the client device and the cellular network, to translate the first message into a format communicable to the client device over the control channel; and to send the first message to the client device over the control channel.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 4 is a schematic block diagram of a cloud computing environment in which various aspects of the disclosure may be implemented;

DETAILED DESCRIPTION

Figure 1:
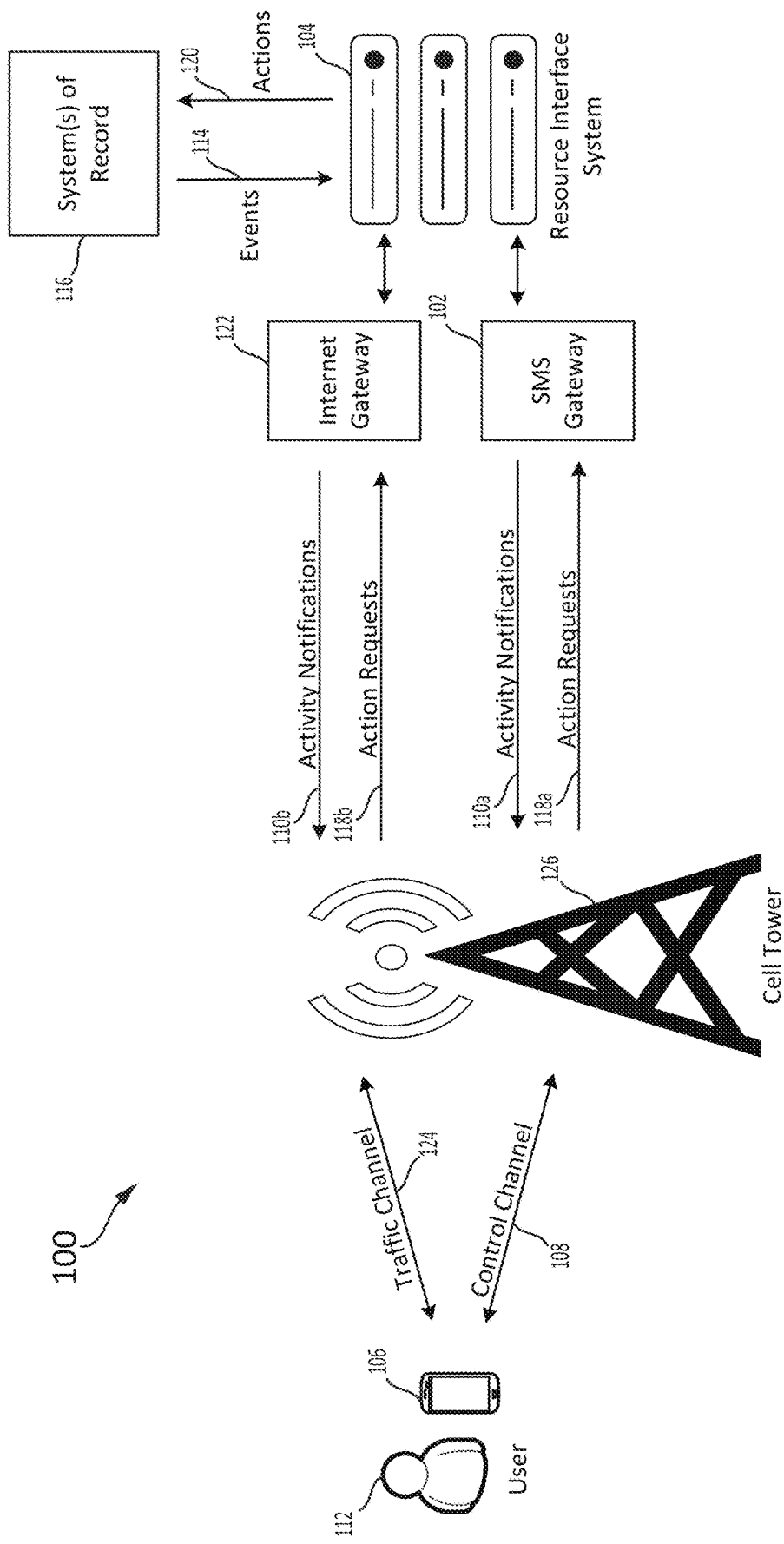
FIG. 1 is a diagram showing an example implementation of a system for exchanging messages over a traffic channel and/or a control channel of a cellular network in accordance with some embodiments of the present disclosure.

For purposes of reading the description of the various embodiments below, the following descriptions of the sections of the specification and their respective contents may be helpful:

Section A provides an introduction to example systems and methods for exchanging messages over a traffic channel and/or a control channel of a cellular network in accordance with some embodiments of the present disclosure;

Section B describes a network environment which may be useful for practicing embodiments described herein;

Section C describes a computing system which may be useful for practicing embodiments described herein;

Section D describes embodiments of systems and methods for delivering shared resources using a cloud computing environment;

Section E describes embodiments of systems and methods for managing and streamlining access by clients to a variety of resources;

Section F provides a more detailed description of the example systems and methods for exchanging messages over a traffic channel and/or a control channel of a cellular network that were introduced above in Section A; and Section G describes example implementations of methods, systems/devices, and computer-readable media in accordance with the present disclosure.

A. Introduction to Illustrative Embodiments of Systems and Methods for Exchanging Messages over a Traffic Channel and/or a Control Channel of a Cellular Network An intelligent activity feed, such as that offered by the Citrix Workspace™ family of products, provides significant benefits, as it allows a user to respond to application-specific events generated by disparate systems of record. An example of a system capable of providing such an activity feed is described in Section E below in connection with FIGS. 5A-D. In such a system, a remote computing system may be responsible for monitoring and interacting with various systems of record (e.g., SaaS applications, web applications, Windows applications, Linux applications, desktops, file repositories and/or file sharing systems, etc.) on behalf of a user operating a client device. As Section E describes, such systems of record may be located either within a cloud computing environment or elsewhere, e.g., within a data center hosted by an organization. In particular, the user may operate the client device so as to interact with "microapps" corresponding to particular functionalities of the systems of record, and such microapps may, in turn, interact with the systems of record, e.g., via application programming interfaces (APIs) of such systems, on behalf of the user. With respect to such systems, the inventors have recognized and appreciated that circumstances may arise in which the data connection between the computing system and the client device may be inadequate to allow effective user interaction with microapps for such purposes.

A cell phone or other mobile device that communicates over a cellular network generally communicates with cell towers using a "control channel." Such communications allow the cellular network to track the location of the mobile device and cause the mobile device to switch cells when needed, among other things. The control channel may also be used to set up a "traffic channel" that can be used to communicate voice or data between the mobile device and another end point. Data is typically transmitted over a traffic channel using the Internet Protocol (IP). It is not uncommon for a mobile device to be able to communicate over a control channel of a cellular network but at the same time be unable to establish or maintain an adequate a traffic channel over the network, thus rendering the mobile device unable to exchange data with another device or system via an Internet connection.

Offered is a technique for allowing user interaction with remote microapps (or similar services) over a control channel of a cellular network in at least some circumstances, such as when an adequate traffic channel cannot be established or maintained. In particular, such interaction may be accomplished by transmitting short message service (SMS) communications over a control channel of a cellular network. By exchanging microapp-related data using such SMS communications, a user of a mobile device may successfully interact with microapps even in the absence of an adequate Internet connection.

FIG. 1 shows an example system 100 in which an SMS gateway 102 may allow data to be exchanged (in the form of SMS messages) between a resource interface system 104 and a client device 106 (e.g., a smartphone) via a control channel 108 of a cellular network. In some embodiments, the resource interface system 104 and/or the SMS gateway 102 may learn a mobile telephone number of the client device 106, e.g., during a registration process, and may securely store that number for future use in sending SMS message from the SMS gateway 102 to the client device 106 and/or in recognizing the client device 106 as the sender of SMS messages the SMS gateway 102 receives from the client device 106. The resource interface system 104 may, for example, correspond to a service that employs microapps, as noted above, to interact with one or more systems of record 116 on behalf of a user 112 of the client device 106. As described in more detail below, the data that is so exchanged may include activity notifications 110a to inform the user 112 of one or more events 114 that are determined to have occurred within one or more of the systems of record 116, and/or action requests 118a that cause the resource interface system 104 to invoke certain actions 120 within the system(s) of record 116 in response to inputs the user 112 provides to the client device 106. As shown, the system 100 may additionally include an internet gateway 122 to allow similar communications (i.e., activity notifications 110b and action requests 118b) to be exchanged (in the form of IP messages) between the resource interface system 104 and the client device 106 via an Internet connection that is established using a traffic channel 124 of the cellular network.

As FIG. 1 illustrates, the control channel 108 and the traffic channel 124 may each be established between a cell tower 126 and the client device 106. The control channel 124 may be used to track the status and location of the client device 106 and to set up the traffic channel 124 to allow communication with the internet gateway 122, using conventional techniques.

In some embodiments, a determination may be made as to whether a connection can be established between the internet gateway 122 and the client device 106 over a traffic channel 124, or one or more operational parameters of an existing connection between the internet gateway 122 and the client device 106 over a traffic channel 124 may be evaluated to determine whether a quality of such connection is adequate to allow the successful exchange of the activity notifications 110b and/or action requests 118b via the traffic channel 124. In some implementations, if the quality of an existing connection between the internet gateway 122 and the client device 106 is determined to be adequate, then the resource interface system 104 may cause the activity notifications 110b and/or the action requests 118b to be communicated between the internet gateway 122 and the client device 106 via the traffic channel 124 (e.g., as IP messages). If, on the other hand, a connection cannot be established between the internet gateway 122 and the client device 106 over a traffic channel 124, or if the quality of an existing connection between the interne gateway 122 and the client device 106 over a traffic channel 124 is determined to be inadequate (e.g., if the available bandwidth over the connection is too low or the round trip latency, packet loss percentage, or packet jitter is too high), then the resource interface system 104 may instead cause the activity notifications 110a and/or the action requests 118a to be communicated between the SMS gateway 102 and the client device 106 via the control channel 108 (e.g., as SMS messages).

In some implementations, the activity notifications 110a sent over the control channel 108 may be formatted as conventional text messages that the client device 106 may present to the user 112 via a standard SMS text messaging application, along with any other text messages the client device 106 happens to receive from other sources. The action requests 118a may likewise, in some implementations, be formatted as conventional text messages, and may include text that is entered by the user 112 via such a standard SMS text messaging application. For example, an activity notification 110a may cause the client device 106 to display an incoming text message indicating that an event was detected within the systems of record 116 and may further indicate possible actions to take relating to the detected event. The incoming text message may, for example, indicate that responding "yes" or "no", or responding with particular numbers or characters, e.g., "1", "2", or "3" or "A," "B", or "C", etc., will result in the taking of specified actions 120. The user 112, if desired, may thus type and send a responsive text message which may then be sent to the SMS gateway 102 (as an action request 118a) for processing by the resource interface system 104. Upon receipt of such a responsive message, the SMS gateway 102 may cause the indicated action 120 to be taken within the corresponding system of record 116.

In some implementations, the user 112 may even type and send a text message including an action request 118a to the SMS gateway 102 without first having received an activity notification 110a in the form of an incoming text message. For example, in some implementations, the user 112 may include standard instructions or codes (e.g., identifying a particular action that is to be taken within a particular system of record) within outgoing text messages directed to the SMS gateway 102, and the resource interface system 104 may cause actions to be taken within the systems of record 116 in accordance with such instructions/codes. As one example, the user 112 may send a text message to the SMS gateway 102 including the text "PTO Feb. 25, 2020," and such a message may be interpreted by the resource interface system 104 as a personal time off request for Feb. 25, 2020, that is to be submitted on the user's behalf to a particular human resources application (i.e., one of the systems of record 116 that the resource interface system 104 can interface with on behalf of the user 112).

In some embodiments, the client device 106 may additionally or alternatively be provisioned with a different local application, i.e., other than a standard SMS text messaging application, that may be given permission to access incoming SMS messages and/or send outgoing SMS messages. The resource access application 522 that is described in Section E below (in connection with FIGS. 5B and 5C) is one example of a local application to which such permissions may be given in some implementations. Such a local application may, for example, correspond to the Citrix Workspace™ app offered by Citrix Systems, Inc., of Fort Lauderdale, Fla. In some implementations, such a local application may use data included incoming SMS messages (received from the SMS gateway 102) to insert notifications into an intelligent activity feed displayed on the client device 106, and may send outgoing SMS messages to the SMS gateway 102 in response to the user 112 interacting with one or more user interface elements presented by the local application, either in association with notifications in the activity feed or otherwise.

In some implementations, the client device 106 may allow access to and/or use of such a local application only upon proper authentication of the identity of the user 112. In some implementations, for example, a short-lived access token that enables access to and/or use of the resource access application 522 may be obtained, e.g., from the identity service 516 and/or identity provider 510 shown in FIG. 5B, following user authentication at a time when an internet connection could be established with the internet gateway 122. In other implementations, encrypted SMS messages may be exchanged between the resource access application 522 (or another resource on the client device 106, 202) and the SMS gateway 102 to authenticate the identity of the user 112 prior to permitting the user to access and/or use the resource access application 522. In still other implementations, use of the resource access application 522 to exchange SMS messages with the SMS gateway 102 may be permitted, in at least some circumstances, without requiring an access token or the like, e.g., for emergency reporting, etc.

Further, it should be appreciated that, in some implementations, such a local application may also receive the activity notifications 110b and send the action requests 118b via the traffic channel 124, as illustrated in FIG. 1. As noted above, communication of the activity notifications 110a and/or action requests 118a via the control channel 108 rather than the traffic channel 124 may be initiated in response to determining that a suitable traffic channel 124 has not been or cannot be established.

No matter the implementation, it should be appreciated that various steps may be taken to ensure security of communications between the client device 102 and the resource interface system 104. For example, in some embodiments, an existing SMS secure transportation service from a wireless mobile provider may provide security for SMS messages over the air at the transport layer, such as using International Telecommunication Union (ITU) and/or International Organization for Standardization (ISO) based $3^{rd}$ generation partnership project (3GPP)/$3^{rd}$ generation partnership project 2 (3GPP2) standardized fifth-generation wireless (5G), long term evolution (LTE), code division multiple access (CDMA), wideband code division multiple access (WCDMA), etc., air interface protocols.

In some implementations, security of communications between the client device 102 and the resource interface system 104 may additionally or alternatively be provided at the application layer, such as by encrypting the data included in the SMS messages exchanged between the SMS gateway 102 and a local application on the client device 106 using an encryption key or other shared secret. Examples of industry standards for enabling suitable encrypting/decrypting methods and/or algorithms that may be applied at the application layer include DataStax Enterprise (DES), Rivest-Shamir-Adleman (RSA), Advanced Encryption Standard (AES), elliptical curve cryptography (ECC), International Data Encryption Algorithm (IDEA), Rivest Cypher 2 (RC2), Rivest Cypher 2 (RC4), etc. In some implementations, multiple SMS messages may be concatenated to allow the transmission of larger quantities of data for respective activity notifications 110a and/or action requests 118a.

Additional details and example implementations of embodiments of the present disclosure are set forth below in Section F, following a description of example systems and network environments in which such embodiments may be deployed.

B. Network Environment

Figure 2:
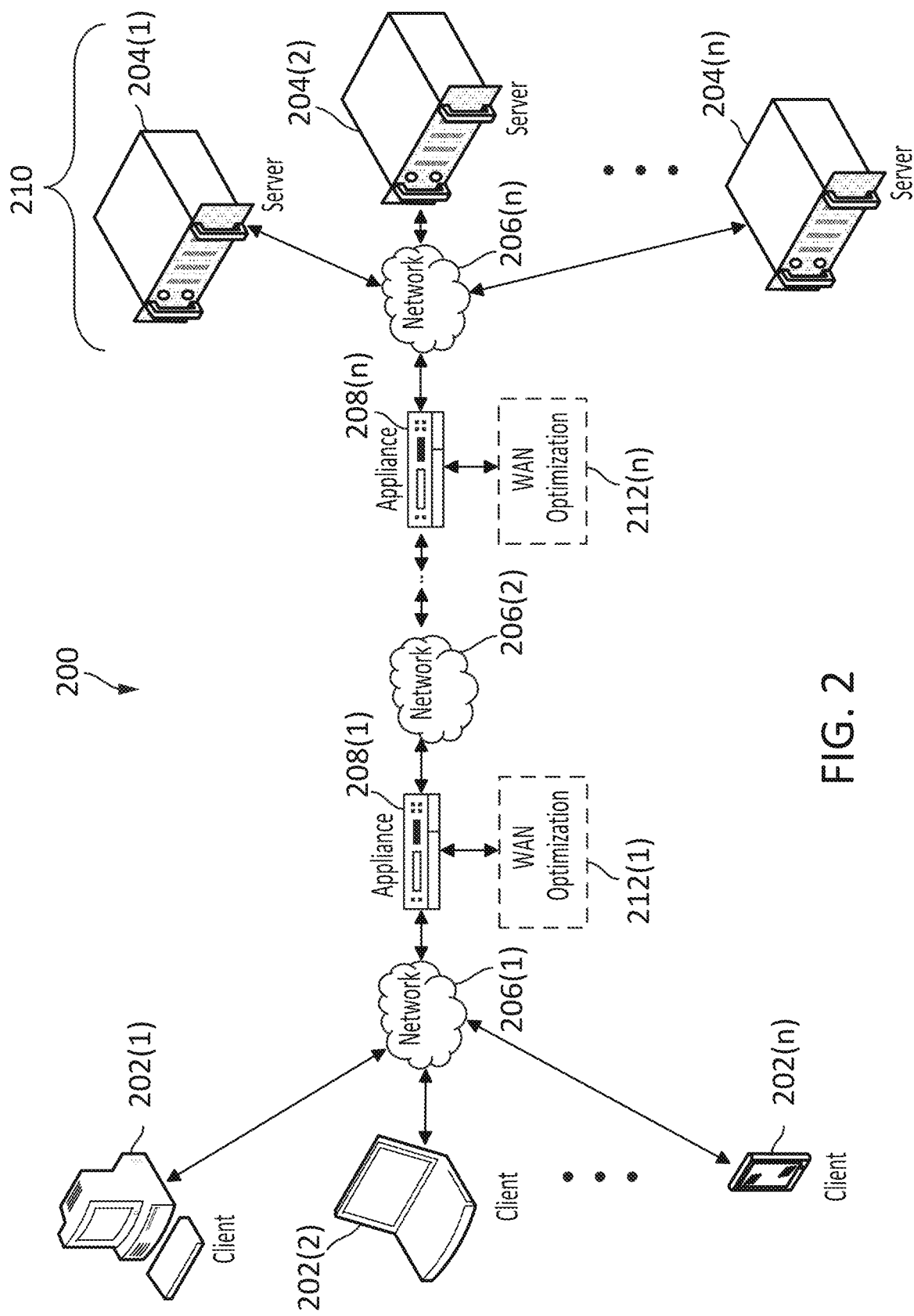
FIG. 2 is a diagram of a network environment in which some embodiments of the message exchange system disclosed herein may be deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), interne protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, Fla., such as Citrix SD-WAN™ or Citrix Cloud™. For example, in some implementations, one or more the appliances 208, 212 may be cloud connectors that enable communications to be exchanged between resources within a cloud computing environment and resources outside such an environment, e.g., resources hosted within a data center of an organization.

C. Computing Environment

Figure 3:
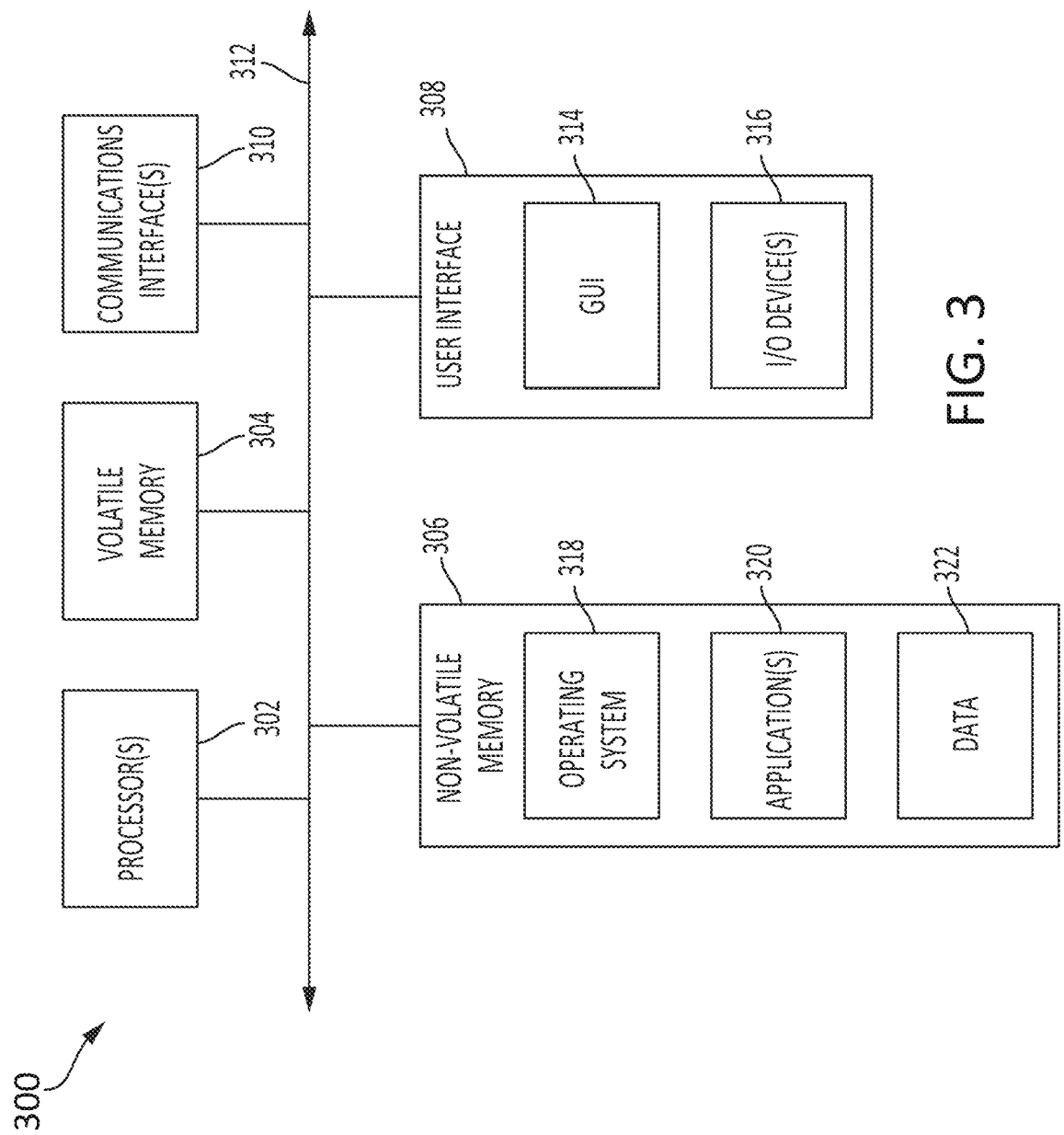
FIG. 3 is a block diagram of a computing system that may be used to implement one or more of the components of the computing environment shown in FIG. 2 in accordance with some embodiments.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

Figure 5A:
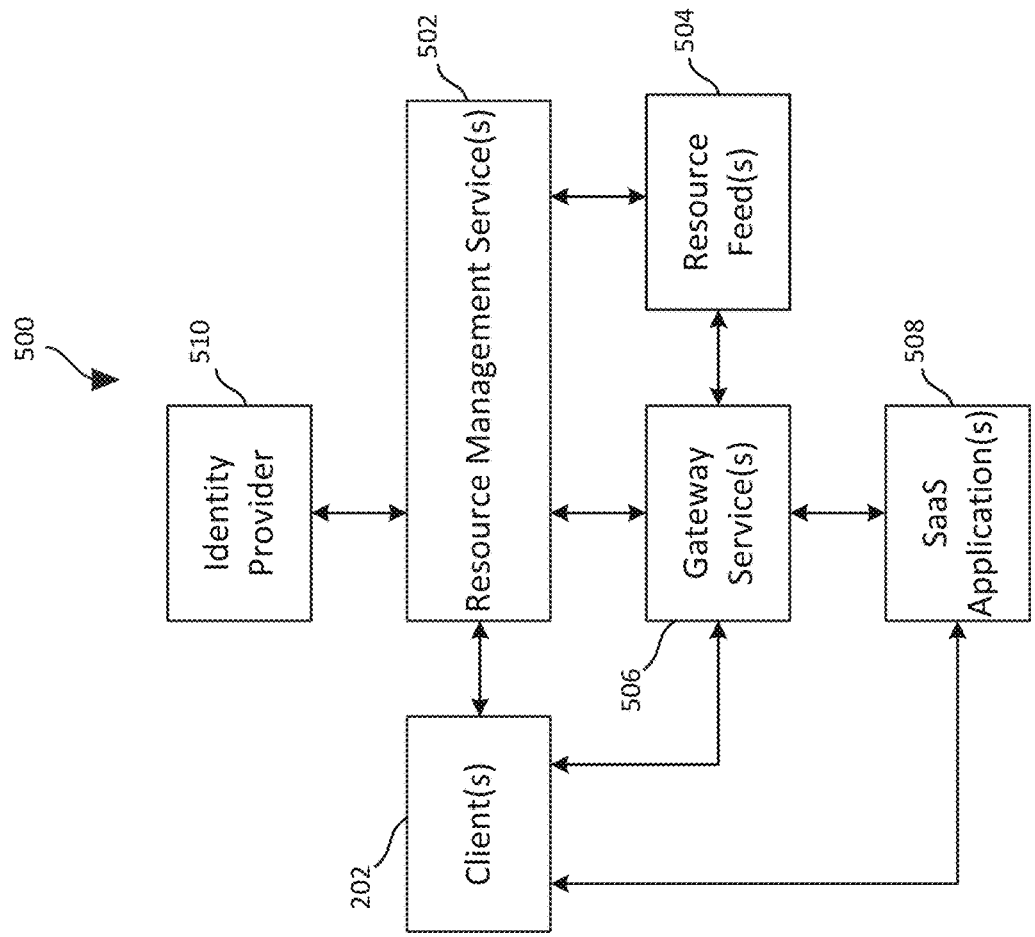
FIG. 5A is a block diagram of an example system in which resource management services may manage and streamline access by clients to resource feeds (via one or more gateway services) and/or software-as-a-service (SaaS) applications.

E. Systems and Methods for Managing and Streamlining Access by Client Devices to a Variety of Resources FIG. 5A is a block diagram of an example system 500 in which one or more resource management services 502 may manage and streamline access by one or more clients 202 to one or more resource feeds 504 (via one or more gateway services 506) and/or one or more software-as-a-service (SaaS) applications 508. In particular, the resource management service(s) 502 may employ an identity provider 510 to authenticate the identity of a user of a client 202 and, following authentication, identify one of more resources the user is authorized to access. In response to the user selecting one of the identified resources, the resource management service(s) 502 may send appropriate access credentials to the requesting client 202, and the client 202 may then use those credentials to access the selected resource. For the resource feed(s) 504, the client 202 may use the supplied credentials to access the selected resource via a gateway service 506. For the SaaS application(s) 508, the client 202 may use the credentials to access the selected application directly.

The client(s) 202 may be any type of computing devices capable of accessing the resource feed(s) 504 and/or the SaaS application(s) 508, and may, for example, include a variety of desktop or laptop computers, smartphones, tablets, etc. The resource feed(s) 504 may include any of numerous resource types and may be provided from any of numerous locations. In some embodiments, for example, the resource feed(s) 504 may include one or more systems or services for providing virtual applications and/or desktops to the client(s) 202, one or more file repositories and/or file sharing systems, one or more secure browser services, one or more access control services for the SaaS applications 508, one or more management services for local applications on the client(s) 202, one or more internet enabled devices or sensors, etc. The resource management service(s) 502, the resource feed(s) 504, the gateway service(s) 506, the SaaS application(s) 508, and the identity provider 510 may be located within an on-premises data center of an organization for which the system 500 is deployed, within one or more cloud computing environments, or elsewhere.

Figure 5B:
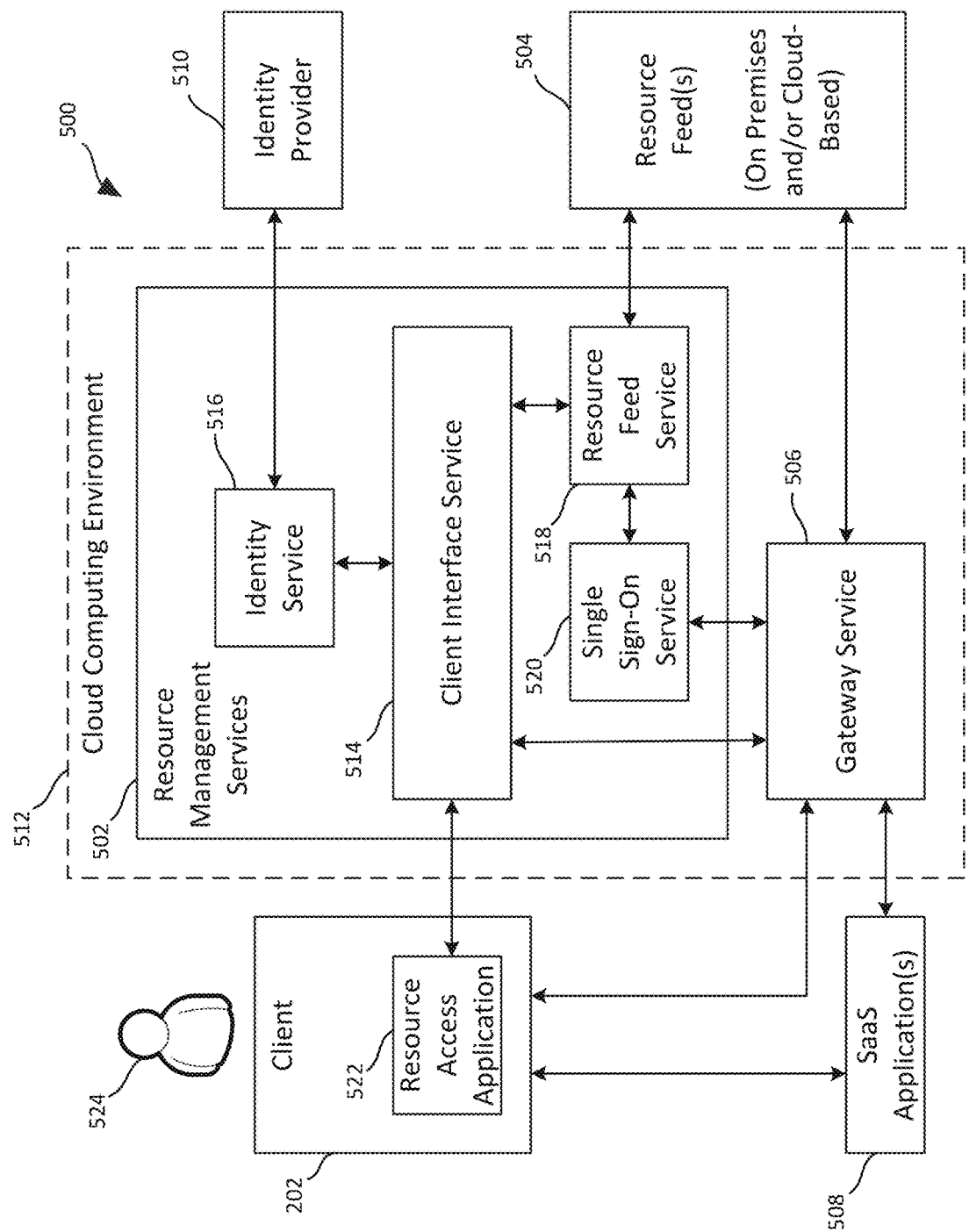
FIG. 5B is a block diagram showing an example implementation of the system shown in FIG. 5A in which various resource management services as well as a gateway service are located within a cloud computing environment.

FIG. 5B is a block diagram showing an example implementation of the system 500 shown in FIG. 5A in which various resource management services 502 as well as a gateway service 506 are located within a cloud computing environment 512. The cloud computing environment may, for example, include Microsoft Azure Cloud, Amazon Web Services, Google Cloud, or IBM Cloud. It should be appreciated, however, that in other implementations, one or more (or all) of the components of the resource management services 502 and/or the gateway service 506 may alternatively be located outside the cloud computing environment 512, such as within a data center hosted by an organization.

For any of the illustrated components (other than the client 202) that are not based within the cloud computing environment 512, cloud connectors (not shown in FIG. 5B) may be used to interface those components with the cloud computing environment 512. Such cloud connectors may, for example, run on Windows Server instances and/or Linux Server instances hosted in resource locations and may create a reverse proxy to route traffic between those resource locations and the cloud computing environment 512. In the illustrated example, the cloud-based resource management services 502 include a client interface service 514, an identity service 516, a resource feed service 518, and a single sign-on service 520. As shown, in some embodiments, the client 202 may use a resource access application 522 to communicate with the client interface service 514 as well as to present a user interface on the client 202 that a user 524 can operate to access the resource feed(s) 504 and/or the SaaS application(s) 508. The resource access application 522 may either be installed on the client 202, or may be executed by the client interface service 514 (or elsewhere in the system 500) and accessed using a web browser (not shown in FIG. 5B) on the client 202.

As explained in more detail below, in some embodiments, the resource access application 522 and associated components may provide the user 524 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 522 is launched or otherwise accessed by the user 524, the client interface service 514 may send a sign-on request to the identity service 516. In some embodiments, the identity provider 510 may be located on the premises of the organization for which the system 500 is deployed. The identity provider 510 may, for example, correspond to an on-premises Windows Active Directory. In such embodiments, the identity provider 510 may be connected to the cloud-based identity service 516 using a cloud connector (not shown in FIG. 5B), as described above. Upon receiving a sign-on request, the identity service 516 may cause the resource access application 522 (via the client interface service 514) to prompt the user 524 for the user's authentication credentials (e.g., user-name and password). Upon receiving the user's authentication credentials, the client interface service 514 may pass the credentials along to the identity service 516, and the identity service 516 may, in turn, forward them to the identity provider 510 for authentication, for example, by comparing them against an Active Directory domain. Once the identity service 516 receives confirmation from the identity provider 510 that the user's identity has been properly authenticated, the client interface service 514 may send a request to the resource feed service 518 for a list of subscribed resources for the user 524.

In other embodiments (not illustrated in FIG. 5B), the identity provider 510 may be a cloud-based identity service, such as a Microsoft Azure Active Directory. In such embodiments, upon receiving a sign-on request from the client interface service 514, the identity service 516 may, via the client interface service 514, cause the client 202 to be redirected to the cloud-based identity service to complete an authentication process. The cloud-based identity service may then cause the client 202 to prompt the user 524 to enter the user's authentication credentials. Upon determining the user's identity has been properly authenticated, the cloud-based identity service may send a message to the resource access application 522 indicating the authentication attempt was successful, and the resource access application 522 may then inform the client interface service 514 of the successfully authentication. Once the identity service 516 receives confirmation from the client interface service 514 that the user's identity has been properly authenticated, the client interface service 514 may send a request to the resource feed service 518 for a list of subscribed resources for the user 524.

The resource feed service 518 may request identity tokens for configured resources from the single sign-on service 520. The resource feed service 518 may then pass the feed-specific identity tokens it receives to the points of authentication for the respective resource feeds 504. The resource feeds 504 may then respond with lists of resources configured for the respective identities. The resource feed service 518 may then aggregate all items from the different feeds and forward them to the client interface service 514, which may cause the resource access application 522 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and DesktopsTM, VMware Horizon, Microsoft RDS, etc.), one or more file repositories and/or file sharing systems (e.g., Sharefile®), one or more secure browsers, one or more internet enabled devices or sensors, one or more local applications installed on the client 202, and/or one or more SaaS applications 508 to which the user 524 has subscribed. The lists of local applications and the SaaS applications 508 may, for example, be supplied by resource feeds 504 for respective services that manage which such applications are to be made available to the user 524 via the resource access application 522. Examples of SaaS applications 508 that may be managed and accessed as described herein include Microsoft Office 365 applications, SAP SaaS applications, Workday applications, etc.

For resources other than local applications and the SaaS application(s) 508, upon the user 524 selecting one of the listed available resources, the resource access application 522 may cause the client interface service 514 to forward a request for the specified resource to the resource feed service 518. In response to receiving such a request, the resource feed service 518 may request an identity token for the corresponding feed from the single sign-on service 520. The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 202 may proceed to access the selected resource.

When the user 524 selects a local application, the resource access application 522 may cause the selected local application to launch on the client 202. When the user 524 selects a SaaS application 508, the resource access application 522 may cause the client interface service 514 to request a one-time uniform resource locator (URL) from the gateway service 506 as well a preferred browser for use in accessing the SaaS application 508. After the gateway service 506 returns the one-time URL and identifies the preferred browser, the client interface service 514 may pass that information along to the resource access application 522. The client 202 may then launch the identified browser and initiate a connection to the gateway service 506. The gateway service 506 may then request an assertion from the single sign-on service 520. Upon receiving the assertion, the gateway service 506 may cause the identified browser on the client 202 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 202 to access the selected SaaS application 508.

In some embodiments, the preferred browser identified by the gateway service 506 may be a specialized browser embedded in the resource access application 522 (when the resource application is installed on the client 202) or provided by one of the resource feeds 504 (when the resource application 522 is located remotely), e.g., via a secure browser service. In such embodiments, the SaaS applications 508 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 504) for assessment of its security risk by a web filtering service. For approved URLs, the specialized browser may be permitted to access the link. For suspicious links, however, the web filtering service may have the client interface service 514 send the link to a secure browser service, which may start a new virtual browser session with the client 202, and thus allow the user to access the potentially harmful linked content in a safe environment.

In some embodiments, in addition to or in lieu of providing the user 524 with a list of resources that are available to be accessed individually, as described above, the user 524 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 524 of something that requires the user's attention (e.g., approval of an expense report, new course available for registration, etc.).

Figure 5C:
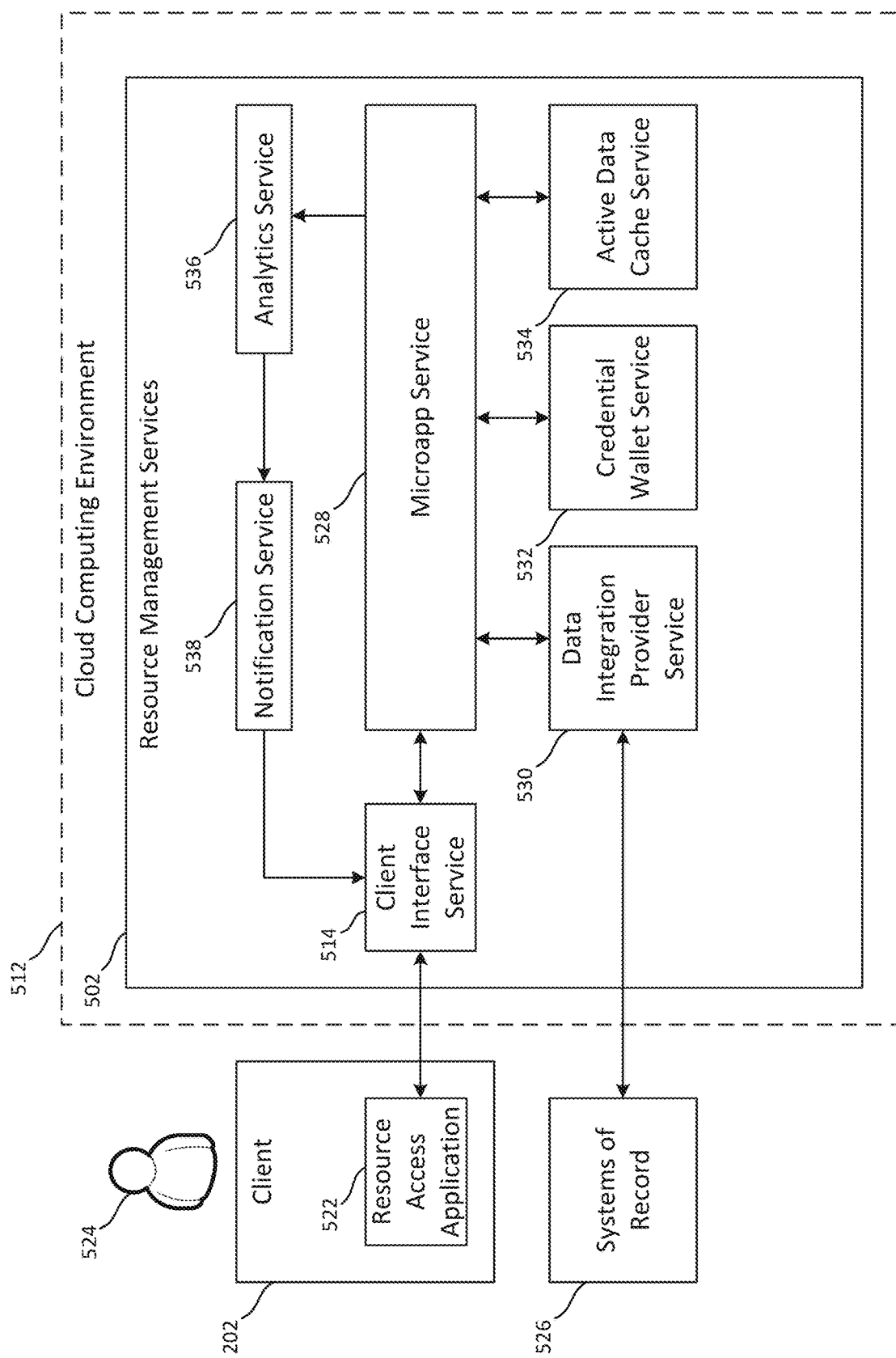
FIG. 5C is a block diagram similar to that shown in FIG. 5B but in which the available resources are represented by a single box labeled "systems of record," and further in which several different services are included among the resource management services.

FIG. 5C is a block diagram similar to that shown in FIG. 5B but in which the available resources (e.g., SaaS applications, web applications, Windows applications, Linux applications, desktops, file repositories and/or file sharing systems, and other data) are represented by a single box 526 labeled "systems of record," and further in which several different services are included within the resource management services block 502. As explained below, the services shown in FIG. 5C may enable the provision of a streamlined resource activity feed and/or notification process for a client 202. In the example shown, in addition to the client interface service 514 discussed above, the illustrated services include a microapp service 528, a data integration provider service 530, a credential wallet service 532, an active data cache service 534, an analytics service 536, and a notification service 538. In various embodiments, the services shown in FIG. 5C may be employed either in addition to or instead of the different services shown in FIG. 5B. Further, as noted above in connection with FIG. 5B, it should be appreciated that, in other implementations, one or more (or all) of the components of the resource management services 502 shown in FIG. 5C may alternatively be located outside the cloud computing environment 512, such as within a data center hosted by an organization.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 522 without having to launch the native application. The system shown in FIG. 5C may, for example, aggregate relevant notifications, tasks, and insights, and thereby give the user 524 a dynamic productivity tool. In some embodiments, the resource activity feed may be intelligently populated by utilizing machine learning and artificial intelligence (AI) algorithms. Further, in some implementations, microapps may be configured within the cloud computing environment 512, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 5C, the systems of record 526 may represent the applications and/or other resources the resource management services 502 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 502, and in particular the data integration provider service 530, may, for example, support REST API, JSON, OData-JSON, and 6ML. As explained in more detail below, the data integration provider service 530 may also write back to the systems of record, for example, using OAuth2 or a service account.

In some embodiments, the microapp service 528 may be a single-tenant service responsible for creating the microapps. The microapp service 528 may send raw events, pulled from the systems of record 526, to the analytics service 536 for processing. The microapp service may, for example, periodically pull active data from the systems of record 526.

In some embodiments, the active data cache service 534 may be single-tenant and may store all configuration information and microapp data. It may, for example, utilize a per-tenant database encryption key and per-tenant database credentials.

In some embodiments, the credential wallet service 532 may store encrypted service credentials for the systems of record 526 and user OAuth2 tokens.

In some embodiments, the data integration provider service 530 may interact with the systems of record 526 to decrypt end-user credentials and write back actions to the systems of record 526 under the identity of the end-user. The write-back actions may, for example, utilize a user's actual account to ensure all actions performed are compliant with data policies of the application or other resource being interacted with.

In some embodiments, the analytics service 536 may process the raw events received from the microapps service 528 to create targeted scored notifications and send such notifications to the notification service 538.

Finally, in some embodiments, the notification service 538 may process any notifications it receives from the analytics service 536. In some implementations, the notification service 538 may store the notifications in a database to be later served in an activity feed. In other embodiments, the notification service 538 may additionally or alternatively send the notifications out immediately to the client 202 as a push notification to the user 524.

In some embodiments, a process for synchronizing with the systems of record 526 and generating notifications may operate as follows. The microapp service 528 may retrieve encrypted service account credentials for the systems of record 526 from the credential wallet service 532 and request a sync with the data integration provider service 530. The data integration provider service 530 may then decrypt the service account credentials and use those credentials to retrieve data from the systems of record 526. The data integration provider service 530 may then stream the retrieved data to the microapp service 528. The microapp service 528 may store the received systems of record data in the active data cache service 534 and also send raw events to the analytics service 536. The analytics service 536 may create targeted scored notifications and send such notifications to the notification service 538. The notification service 538 may store the notifications in a database to be later served in an activity feed and/or may send the notifications out immediately to the client 202 as a push notification to the user 524.

In some embodiments, a process for processing a user-initiated action via a microapp may operate as follows. The client 202 may receive data from the microapp service 528 (via the client interface service 514) to render information corresponding to the microapp. The microapp service 528 may receive data from the active data cache service 534 to support that rendering. The user 524 may invoke an action from the microapp, causing the resource access application 522 to send an action request to the microapp service 528 (via the client interface service 514). The microapp service 528 may then retrieve from the credential wallet service 532 an encrypted Oauth2 token for the system of record for which the action is to be invoked, and may send the action to the data integration provider service 530 together with the encrypted OAuth2 token. The data integration provider service 530 may then decrypt the OAuth2 token and write the action to the appropriate system of record under the identity of the user 524. The data integration provider service 530 may then read back changed data from the written to system of record and send that changed data to the microapp service 528. The microapp service 528 may then update the active data cache service 534 with the updated data and cause a message to be sent to the resource access application 522 (via the client interface service 514) notifying the user 524 that the action was successfully completed.

In some embodiments, in addition to or in lieu of the functionality described above, the resource management services 502 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 502 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 502 may, for example, parse these requests and respond because they are integrated with multiple systems on the back-end. In some embodiments, users may be able to interact with the virtual assistant through either the resource access application 522 or directly from another resource, such as Microsoft Teams. This feature may allow employees to work efficiently, stay organized, and deliver only the specific information they're looking for.

Figure 5D:
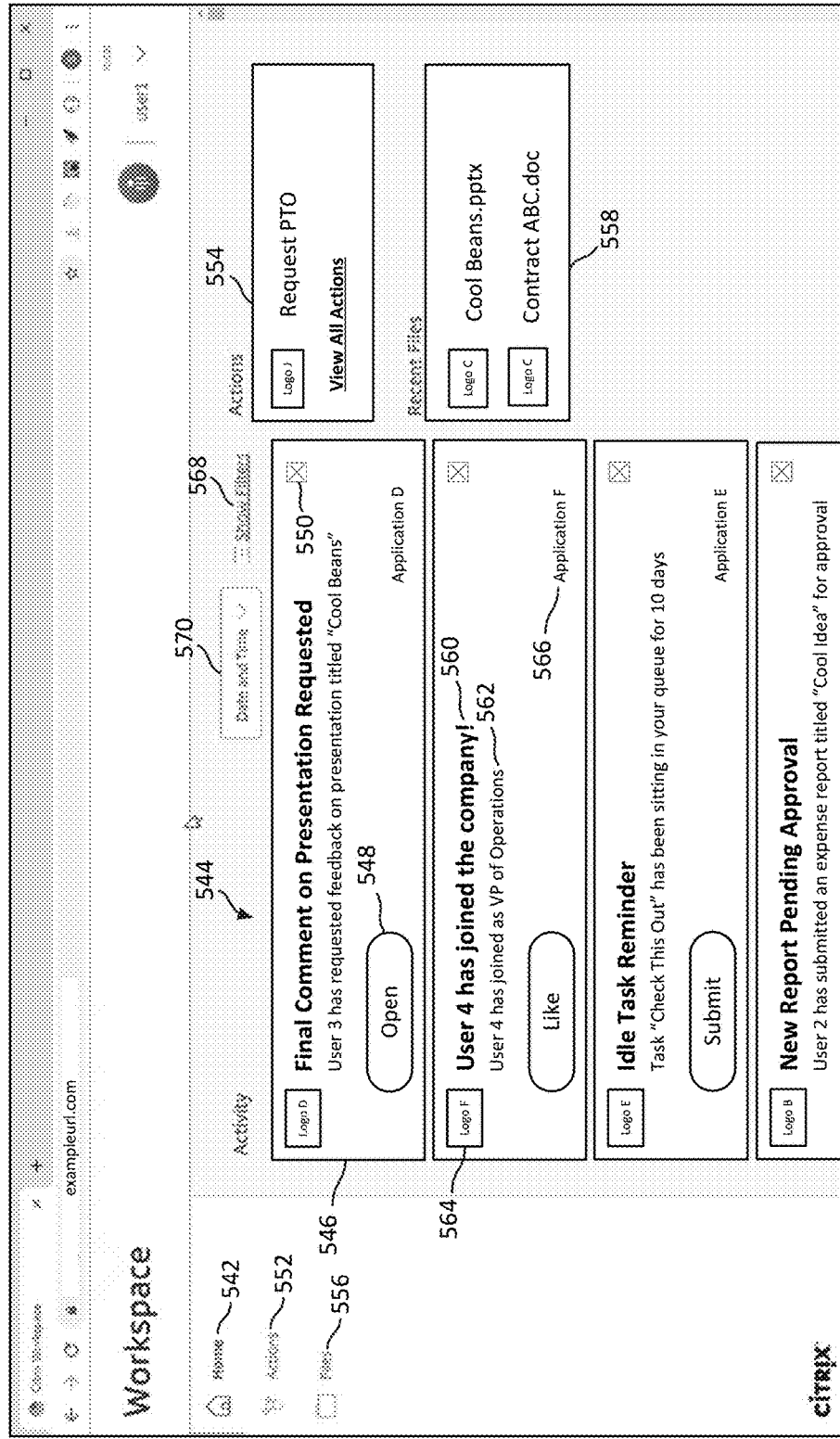
FIG. 5D shows how a display screen may appear when an intelligent activity feed feature of a multi-resource management system, such as that shown in FIG. 5C, is employed.

FIG. 5D shows how a display screen 540 presented by a resource access application 522 (shown in FIG. 5C) may appear when an intelligent activity feed feature is employed and a user is logged on to the system. Such a screen may be provided, for example, when the user clicks on or otherwise selects a "home" user interface element 542. As shown, an activity feed 544 may be presented on the screen 540 that includes a plurality of notifications 546 about respective events that occurred within various applications to which the user has access rights. An example implementation of a system capable of providing an activity feed 544 like that shown is described above in connection with FIG. 5C. As explained above, a user's authentication credentials may be used to gain access to various systems of record (e.g., SalesForce, Ariba, Concur, RightSignature, etc.) with which the user has accounts, and events that occur within such systems of record may be evaluated to generate notifications 546 to the user concerning actions that the user can take relating to such events. As shown in FIG. 5D, in some implementations, the notifications 546 may include a title 560 and a body 562, and may also include a logo 564 and/or a name 566 of the system or record to which the notification 546 corresponds, thus helping the user understand the proper context with which to decide how best to respond to the notification 546. In some implementations, one of more filters may be used to control the types, date ranges, etc., of the notifications 546 that are presented in the activity feed 544. The filters that can be used for this purpose may be revealed, for example, by clicking on or otherwise selecting the "show filters" user interface element 568. Further, in some embodiments, a user interface element 570 may additionally or alternatively be employed to select a manner in which the notifications 546 are sorted within the activity feed. In some implementations, for example, the notifications 546 may be sorted in accordance with the "date and time" they were created (as shown for the element 570 in FIG. 5D) and/or an "application" mode (not illustrated) may be selected (e.g., using the element 570) in which the notifications 546 may be sorted by application type.

When presented with such an activity feed 544, the user may respond to the notifications 546 by clicking on or otherwise selecting a corresponding action element 548 (e.g., "Approve," "Reject," "Open," "Like," "Submit," etc.), or else by dismissing the notification, e.g., by clicking on or otherwise selecting a "close" element 550. As explained in connection with FIG. 5C below, the notifications 546 and corresponding action elements 548 may be implemented, for example, using "microapps" that can read and/or write data to systems of record using application programming interface (API) functions or the like, rather than by performing full launches of the applications for such systems of record. In some implementations, a user may additionally or alternatively view additional details concerning the event that triggered the notification and/or may access additional functionality enabled by the microapp corresponding to the notification 546 (e.g., in a separate, pop-up window corresponding to the microapp) by clicking on or otherwise selecting a portion of the notification 546 other than one of the user-interface elements 548, 550. In some embodiments, the user may additionally or alternatively be able to select a user interface element either within the notification 546 or within a separate window corresponding to the microapp that allows the user to launch the native application to which the notification relates and respond to the event that prompted the notification via that native application rather than via the microapp. In addition to the event-driven actions accessible via the action elements 548 in the notifications 546, a user may alternatively initiate microapp actions by selecting a desired action, e.g., via a drop-down menu accessible using the "action" user-interface element 552 or by selecting a desired action from a list 554 of recently and/or commonly used microapp actions. As shown, the user may also access files (e.g., via a Citrix ShareFile™ platform) by selecting a desired file, e.g., via a drop-down menu accessible using the "files" user interface element 556 or by selecting a desired file from a list 558 of recently and/or commonly used files.

Although not shown in FIG. 5D, it should be appreciated that, in some implementations, additional resources may also be accessed through the screen 540 by clicking on or otherwise selecting one or more other user interface elements that may be presented on the screen. For example, in some embodiments, one or more virtualized applications may be accessible (e.g., via a Citrix Virtual Apps and DesktopsTM service) by clicking on or otherwise selecting an "apps" user-interface element (not shown) to reveal a list of accessible applications and/or one or more virtualized desktops may be accessed (e.g., via a Citrix Virtual Apps and DesktopsTM service) by clicking on or otherwise selecting a "desktops" user-interface element (not shown) to reveal a list of accessible desktops.

The activity feed shown in FIG. 5D provides significant benefits, as it allows a user to respond to application-specific events generated by disparate systems of record without needing to navigate to, launch, and interface with multiple different native applications.

F. Detailed Description of Example Embodiments of Systems and Methods for Exchanging Messages over a Traffic Channel and/or a Control Channel of a Cellular Network As noted above in Section A, in some embodiments, the resource interface system 104 described in connection with in FIG. 1 may interface with one or more of the systems of record 116 on behalf of the user 112 of the client device 106. The described functionality of the resource interface system 104 may, for example, be included within, or operate in conjunction with, the resource management services 502 described above in connection with FIGS. 5A-C. As described, in some embodiments, those resource management services 502 may include the microapp service 528 which, together with other services, may interact with the systems of record 526 on behalf of the user 524. In particular, in the example system described in connection with FIG. 5C, the data integration provider service 530 may access authentication credentials of the user 524 that are stored by the credential wallet service 532, and use those credentials to access respective systems of record 526 on the user's behalf, e.g., via APIs. Accessing the systems of record 526 in such fashion may allow the analytics service 536 to detect significant events within the systems of record 526 so that such events may be reported to the client 202 via the notification service 538, and may also allow the microapp service 528 to act on action requests received from the resource access application 522 of the client 202 (in response to inputs by the user 524) by causing the data integration provider service 530 to alter one or more records within the systems of record 526 on the user's behalf As described in connection with FIGS. 5B and 5C, in some implementations, the resource management services 502 may include the client interface service 514, which may provide an interface between the client 202 and the remainder of the resource management services 502.

Figure 6:
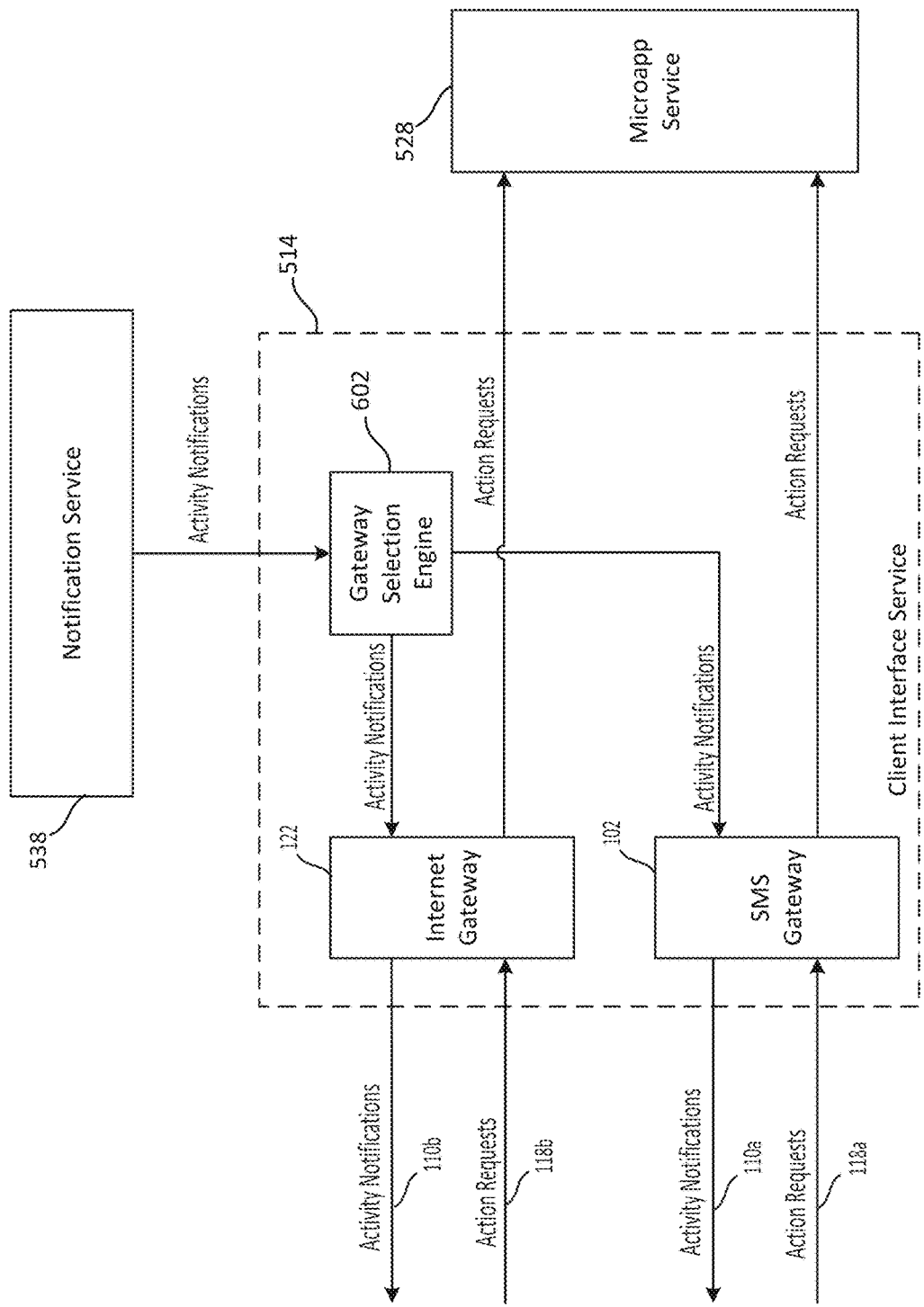
FIG. 6 is a block diagram illustrating functional components that may be included within the client interface service shown in FIGS. 5B and 5C to facilitate the exchange of messages over a traffic channel and/or a control channel of a cellular network in accordance with some embodiments of the present disclosure.

FIG. 6 illustrates functional components that may, in some embodiments, be included within the client interface service 514 shown in FIGS. 5B and 5C to allow the resource management services 502 to communicate with the client 106, 202 over the control channel 108 of the cell tower 126 (e.g., via SMS messages) in addition to or in lieu of the traffic channel 124 (e.g., via IP messages). As shown in FIG. 6, in addition to the SMS gateway 102 and the internet gateway 122 (which are also shown in FIG. 1), the client interface service 514 may include a gateway selection engine 602 that may determine whether activity notifications received from the notification service 538 are routed to the internet gateway 122, where they may be sent (as IP messages) to the client device 106, 202, or to the SMS gateway 102, where they may be sent (as SMS messages), to the client device 106, 202. Although not shown in FIG. 6, it should be appreciated that the gateway selection engine 602 and/or the SMS gateway 102 may have access to a stored mobile phone number of the client device 106, 202, which phone number may be used by the SMS gateway 102 to transmit activity notifications 110a to the client device 106, 202 over the control channel 108 of the cell tower 126.

In some implementations, the activity notifications received from the notification service 538 may be formatted using a markup language or the like in which individual elements are labeled or otherwise identified, and the gateway selection engine 602, the SMS gateway 102, and/or the internet gateway 122 may translate the received activity notifications into suitable formats for transmission over respective channels 108, 124 and/or processing by the client device 106, 202. In other implementations, the activity notifications received from the activity notification service 538 may already be formatted for transmission as IP messages, and the gateway selection engine 602 and/or the SMS gateway 102 may translate such messages, when needed, into a format suitable for transmission as SMS messages over the control channel 108. In some implementations, the content of the activity notifications received from the notification service 538 may further be encrypted (by the gateway selection engine 602, the internet gateway 122, and/or the SMS gateway 102) prior to being transmitted over the cellular network by the internet gateway 122 or the SMS gateway 102. In some implementations, for example, the resource management services 502 and the client device 106, 202 may exchange encryption/decryption keys during a secure session following authentication of the user 112, 524, and such keys may subsequently be used by both the resource management services 502 and the client device 106, 202 for encryption/decryption purposes.

As FIG. 6 also illustrates, any action requests 118a that are received by the SMS gateway 102, as well as any action requests 118b that are received by the internet gateway 122, may be passed to the microapp service 528 for processing, as discussed above. In some embodiments, the action requests 118a received by the SMS gateway 102 may be translated into a format that is consistent with the format of the action requests 118b that are received by the internet gateway 122. Alternatively, the SMS gateway 102 and/or the internet gateway 122 may translate the differently formatted action requests 118a, 118b that they receive into a common format, e.g., using a markup language or the like, that is consumable by the microapp service 528. In some implementations, such action requests 118a, 118b may also be encrypted before being transmitted over the cellular network. In such implementations, such messages may be decrypted by the SMS gateway 102, the internet gateway 122, and/or the microapp service 528, so that they may be subjected to further processing, as described above.

Figure 7:
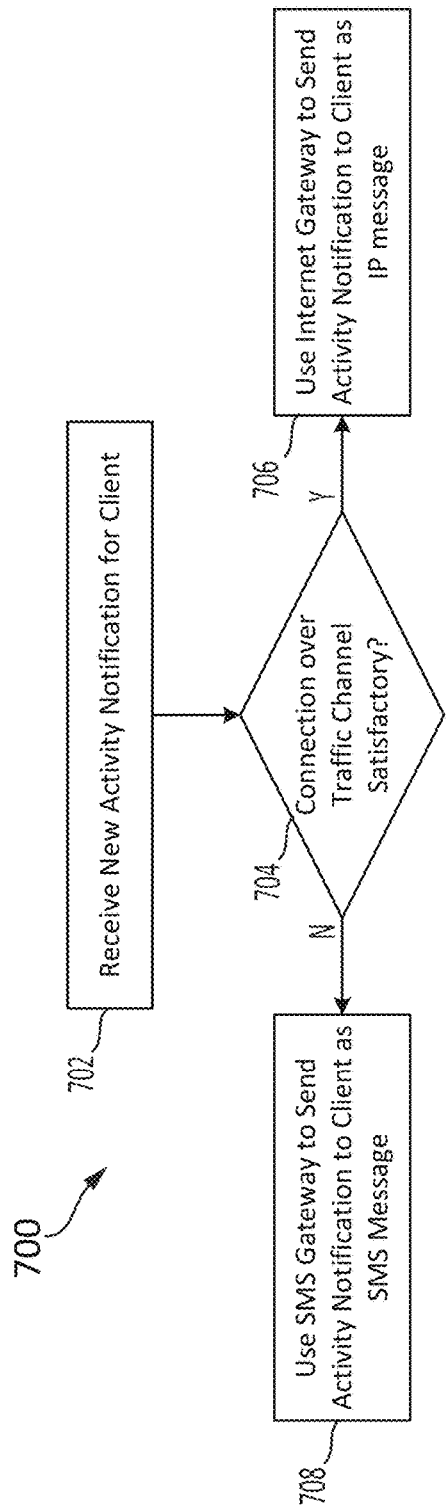
FIG. 7 is a flowchart illustrating an example routine that may be executed by the gateway selection engine shown in FIG. 6.

FIG. 7 shows an example routine 700 that may be performed by the gateway selection engine 602 shown in FIG. 6 in accordance with some embodiments of the present disclosure. The routine 700 may, for example, be performed by one or more processors that are configured and arranged to execute instructions encoded within one or more computer-readable media. As shown, at a step 702, the gateway selection engine 602 may receive a new activity notification to be sent to the client device 106, 202. At a decision step 704, the gateway selection engine 602 may determine whether there exists a data connection over a traffic channel 124 between the internet gateway 122 and the client device 106, 202 that is adequate for purposes of communicating the received activity notification to the client device 106, 202 as an IP message.

In some implementations, the evaluation performed at the decision step 704 may involve determining whether a data connection (via a traffic channel of the cell tower 126) can be established between the internet gateway 122 and the client device 106, 202 and/or determining whether one or more characteristics of a data connection that has already been established between the internet gateway 122 and the client device 106, 202 are adequate to effectively exchange the activity notifications 110b and/or the action requests 118b. For example, in some embodiments, the gateway selection engine 602 may evaluate data exchanges with the client device 106, 202 (periodically or otherwise) to assess one or more performance parameters of an existing data connection between the internet gateway 122 and the client device 106, 202, such as available bandwidth, round trip latency, packet loss percentage, packet jitter, etc. A connection may be determined to be inadequate for purposes of exchanging the activity notifications 110b and/or the action requests 118b when, for example, one or more of evaluated parameters fail to meet a threshold criterion.

The gateway selection engine 602 may, for example, determine that an available bandwidth over the traffic channel 124 is below a threshold value (e.g., one megabits per second (Mbps)), that a round trip latency over the traffic channel 124 is above a threshold value (e.g., two-hundred milliseconds), that a packet loss percentage via the traffic channel 124 is above a threshold value (e.g., one percent), that packet jitter is above a threshold value (e.g., thirty milliseconds). In some embodiments, one or more such threshold values may be set by a system administrator. Further, in some embodiments, different threshold values may be set for different systems of record 116, 526, different microapps, different types of events 114 and/or different types of actions 120. In some implementations, the gateway selection engine 602 may employ one or more trained machine learning (ML) models to evaluate performance parameters of an existing data connection between the internet gateway 122 and the client device 106, 202 to determine whether that connection is adequate for purposes of exchanging the activity notifications 110b and/or the action requests 118b. In some implementations, for example, a training data set may be developed in which respective sets of performance parameters measured at different times are tagged as either "adequate" or "inadequate." Each such set of performance parameters may be encoded into a feature vector, and such feature vectors may then be fed to a machine learning algorithm, together with the corresponding tags, to generate a predictive model. Once the predictive model has been generated, a subsequently measured set of the performance parameters may be fed to the predictive model and the predictive model may output an indication that those parameters are either "adequate" or "inadequate," consistent with the tags that were used to train the model.

In some embodiments, available bandwidth may be determined by periodically measuring the amount of data (in bits) sent every second for both download and upload. An average download speed and an average upload speed may then be determined by calculating averages of such periodically measured amounts.

In systems that implement packet flow control, e.g., transmission control protocol (TCP) based applications or user-datagram protocol (UDP) based applications like QUIC, EDT, for each packet that is sent from a transmitting device to a recipient device, the recipient device will return an acknowledgement ("ACK") message to the transmitting device. In such systems, a round trip latency value may be determined, for example, by calculating a difference between a time when a packet is sent and a time that an ACK message is received from the recipient device. In addition, in such systems, packets for which an ACK message is not received may be deemed to have been lost. A packet loss percentage may thus be calculated, in some embodiments, as a ratio of total number of packets lost to the total number of packets sent.

Packet jitter, sometimes referred to as packet delay variation (PDV), is the variation in latency as measured in the variability over time of the end-to-end delay across a network. A network with constant delay has no packet jitter. In some embodiments, packet jitter may be determined by measuring time differences between packet inter-arrival times. Packet jitter may, for example, be expressed as an average of the deviation from the network mean delay.

In some embodiments, a service, such as the Connection Quality Indicator, offered by Citrix Systems, Inc., of Fort Lauderdale, Fla., may additionally or alternatively be used to assess one or more performance parameters of a data connection between the internet gateway 122 and the client device 106, 202.

Referring again to FIG. 7, when it is determined (at the decision step 704), that there does exist an adequate data connection over the traffic channel 124, the routine 700 may proceed to a step 706, at which the gateway selection engine 602 may select the internet gateway 122 for transmission of the activity notification 110b over the traffic channel 124 (e.g., as an IP message) to the client device 106, 202. When, on the other hand, it is determined (at the decision step 704), that there does not exist an adequate data connection over a traffic channel 124, the routine 700 may proceed to a step 708, at which the gateway selection engine 602 may instead select the SMS gateway 102 for transmission of the activity notification 110a over the control channel 108 (e.g., as an SMS message) to the client device 106, 202.

As noted above in Section A, in some embodiments, the client device 106 may additionally or alternatively be provisioned with a local application, other than a standard SMS text messaging application, that may be given permission to access incoming SMS messages and/or send outgoing SMS messages. The resource access application 522 that is described in Section E above (in connection with FIGS. 5B and 5C) is one example of a local application to which such permissions may be given in some implementations. As was also noted above, in some embodiments, such a local application may use data included incoming SMS messages (received from the SMS gateway 102) to insert notifications 546 into an intelligent activity feed 544 (see FIG. 5D) presented on the client device 106, and may send outgoing SMS messages to the SMS gateway 102 in response to the user 112 interacting with one or more user interface elements 548, 550, 554 presented by the local application, either in association with notifications 546 in the activity feed 544 or otherwise. In some implementations, the resource access application 522 and one or more components of the resource interface system 104 may employ a proprietary protocol that defines a specific SMS communication format, parameters, encryption algorithms, etc., to allow interaction between the resource access application 522 and the notification service 538 and/or the microapp service 528, as described herein.

In some implementations, the resource access application 522 (or other local application employed by the client device 106) may also determine whether to communicate with the resource interface system 104 over a traffic channel 124 (e.g., via IP messages) or over the control channel 108 (e.g., via SMS messages). For example, in some embodiments, the resource access application 522 of the client device 106, 202 may determine whether there exists a data connection over the traffic channel 124 that is adequate for receiving the activity notifications 110b and/or transmitting the action requests 118b, and may opt to communicate over the control channel 108 (e.g., via SMS messages), rather than over a traffic channel 124 (e.g., via IP messages), if a suitable data connection over the traffic channel 124 is found not to exist. In some embodiments, the client device 106, 202 may additionally or alternatively enable the user 112, 524 to manually select (via the resource access application 522 or otherwise) to communicate with the SMS gateway 102 over the control channel 108 rather than with the internet gateway 122 over the traffic channel 124, for security reasons, etc.

Figure 8:
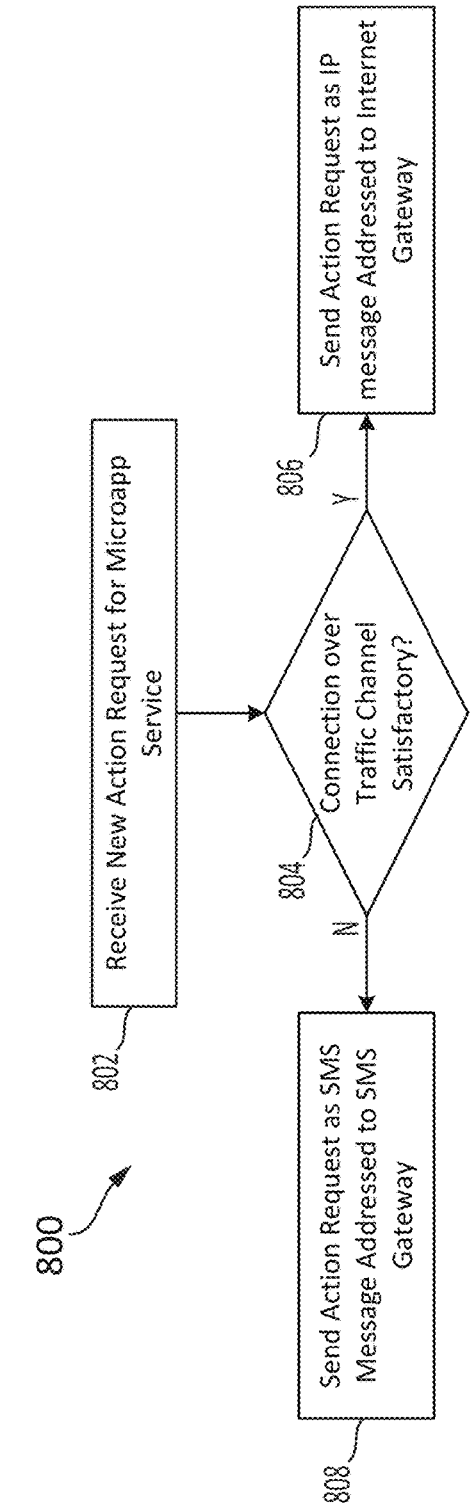
FIG. 8 is a flowchart illustrating an example routine that may be executed by the resource access application shown in FIGS. 5B and 5C.

FIG. 8 shows an example routine 800 that may be performed by the resource access application 522 (shown in FIGS. 5B and 5C) in some implementations. The routine 800 may, for example, be performed by one or more processors that are configured and arranged to execute instructions encoded within one or more computer-readable media. As shown, at a step 802, the resource access application 522 may detect a user input indicating that a new action request is to be sent to resource interface system 104 (e.g., to the client interface service 514). At a decision step 804, the resource access application 522 may determine whether there exists a data connection over a traffic channel 124 between the client device 106, 202 and the internet gateway 122 that is adequate for purposes of communicating the action request to the resource interface system 104 as an IP message.

Similar to the evaluation performed at the step 704 of the routine 700, in some implementations, the evaluation performed at the decision step 804 may involve determining whether a data connection (via a traffic channel 124 of the cell tower 126) can be established between the client device 106, 202 and the internet gateway 122 and/or determining whether one or more characteristics of a data connection that has already been established between the client device 106, 202 and the internet gateway 122 are adequate to effectively exchange the action requests 118b and/or the activity notifications 110b. For example, in some embodiments, the resource access application 522 may evaluate data exchanges with the internet gateway 122 (periodically or otherwise) to assess one or more performance parameters of an existing data connection between the client device 106, 202 and the internet gateway 122, such as available bandwidth, round trip latency, packet loss percentage, packet jitter, etc. A connection may be determined to be inadequate for purposes of exchanging the action requests 118b and/or the activity notifications 110b when, for example, one or more of evaluated parameters fail to meet a threshold criterion.

The resource access application 522 may, for example, determine that an available bandwidth over the traffic channel 124 is below a threshold value (e.g., one megabits per second (Mbps)), that a round trip latency over the traffic channel 124 is above a threshold value (e.g., two-hundred milliseconds), that a packet loss percentage via the traffic channel 124 is above a threshold value (e.g., one percent), that packet jitter is above a threshold value (e.g., thirty milliseconds). In some embodiments, one or more such threshold values may be set by a system administrator. Further, in some embodiments, different threshold values may be set for different systems of record 116, 526 and/or different types of events 114 and/or actions 120.

In some embodiments, available bandwidth may be determined by periodically measuring the amount of data (in bits) sent every second for both upload and download. An average upload speed and an average download speed may then be determined by calculating averages of such periodically measured amounts.

In systems that implement packet flow control, e.g., transmission control protocol (TCP) based applications or user-datagram protocol (UDP) based applications like QUIC, EDT, for each packet that is sent from a transmitting device to a recipient device, the recipient device will return an acknowledgement ("ACK") message to the transmitting device. In such systems, a round trip latency value may be determined, for example, by calculating a difference between a time when a packet is sent and a time that an ACK message is received from the recipient device. In addition, in such systems, packets for which an ACK message is not received may be deemed to have been lost. A packet loss percentage may thus be calculated, in some embodiments, as a ratio of total number of packets lost to the total number of packets sent.

Packet jitter, sometimes referred to as packet delay variation (PDV), is the variation in latency as measured in the variability over time of the end-to-end delay across a network. A network with constant delay has no packet jitter. In some embodiments, packet jitter may be determined by measuring time differences between packet inter-arrival times. Packet jitter may, for example, be expressed as an average of the deviation from the network mean delay.

In some embodiments, a service, such as the Connection Quality Indicator, offered by Citrix Systems, Inc., of Fort Lauderdale, Fla., may additionally or alternatively be used to assess one or more performance parameters of a data connection between the client device 106, 202 and the internet gateway 122.

When it is determined (at the decision step 804 of the routine 800), that a data connection over the traffic channel 124 is adequate, the routine 800 may proceed to a step 806, at which the resource access application 522 may format and send the action request 118b over the traffic channel 124 (e.g., as an IP message) to the internet gateway 122. When, on the other hand, it is determined (at the decision step 804), that there does not exist an adequate data connection over a traffic channel 124, the routine 800 may proceed to a step 808, at which the resource access application 522 may instead format and send the action request 118a over the control channel 108 (e.g., as an SMS message) to the SMS gateway 102.

G. Example Implementations of Methods, Systems, and Computer-Readable Media in Accordance with the Present Disclosure The following paragraphs (M1) through (M23) describe examples of methods that may be implemented in accordance with the present disclosure.

(M1) A method may involve determining, by a computing system, that a first message is to be sent to a client device, the first message being indicative of a first event of a remote application; determining, by the computing system, to communicate the first message to the client device over a control channel of a cellular network based at least in part on (A) an inability to establish a traffic channel between the client device and the cellular network, or (B) one or more attributes of an established traffic channel between the client device and the cellular network; translating, by the computing system, the first message into a format communicable to the client device over the control channel; and sending, by the computing system, the first message to the client device over the control channel.

(M2) A method may be performed as described in paragraph (M1), wherein determining to communicate the first message to the client device over the control channel is based at least in part on the inability to establish a traffic channel between the client device and the cellular network.

(M3) A method may be performed as described in paragraph (M1), wherein determining to communicate the first message to the client device over the control channel is based at least in part on the one or more attributes of an established traffic channel between the client device and the cellular network.

(M4) A method may be performed as described in any of paragraphs (M1) through (M3), and may further involve configuring the first message to cause the client device to present an indication of at least a first action that can be taken with respect to the remote application to respond to the first event; receiving, by the computing system and over the control channel, a second message indicating that the first action is to be taken with respect to the remote application; and causing, by the computing system and based at least in part on the second message, the first action to be taken with respect to the remote application.

(M5) A method may be performed as described in any of paragraphs (M1) through (M4), and may further involve storing, by the computing system, first access credentials that enable a user of the client device to access a first account associated with the remote application; providing, by the computing system, the first access credentials to the remote application to access first data associated with the first account; detecting, by the computing system, a change to the first data; and generating, by the computing system and based at least in part on the change to the first data, the first message to indicate the first event.

(M6) A method may be performed as described in paragraph (M5), and may further involve receiving, by the computing system and from the client device over the control channel, a response to the first message; and causing, by the computing system, the first data to be altered based at least in part on the response.

(M7) A method may be performed as described in paragraph (M5) or paragraph (M6), wherein accessing the first data associated with the first account may further involve using the first access credentials to access the first data via an application programming interface (API) of the remote application.

(M8) A method may be performed as described in any of paragraphs (M1) through (M7), wherein the computing system may include a short message service (SMS) gateway, and the method and may further involve sending the first message further comprises sending at least one SMS communication representing the first message from the SMS gateway to the client device.

(M9) A method may involve detecting, by a client device, a user input indicating an action that is to be taken with respect to a remote application; determining, by the client device, that a first message is to be sent to a remote computing system, the first message indicating that the action is to be taken; determining, by the client device, to communicate the first message to the remote computing system over a control channel of a cellular network based at least in part on (A) an inability to establish a traffic channel between the client device and the cellular network, or (B) one or more attributes of an established traffic channel between the client device and the cellular network; translating, by the client device, the first message into a format communicable to the remote computing system over the control channel; and sending, by the client device, the first message to the remote computing system over the control channel.

(M10) A method may be performed as described in paragraph (M9), wherein determining to communicate the first message to the remote computing system over the control channel is based at least in part on the inability to establish a traffic channel between the client device and the cellular network.

(M11) A method may be performed as described in paragraph (M9), wherein determining to communicate the first message to the remote computing system over the control channel is based at least in part on the one or more attributes of an established traffic channel between the client device and the cellular network.

(M12) A method may be performed as described in paragraph (M9) or paragraph (M10), and may further involve receiving, by the client device and from the remote computing system, a second message indicative of a first event of a remote application; and presenting, by the client device and based at least in part on the second message, an indication to provide the user input to take the action to respond to the first event.

(M13) A method may be performed as described in any of paragraphs (M9) through paragraph (M12), and may further involve sending the first message further comprises sending at least one short message service (SMS) communication representing the first message to the remote computing system.

(M14) A method may involve storing, by a computing system, first access credentials that enable a first user to access a first account maintained by a remote system of record; providing, by the computing system, the first access credentials to the remote system of record to access first data associated with the first account; detecting, by the computing system, a change to the first data; generating, by the computing system, a first notification relating to the change to the first data; and sending, by the computing system and over a control channel of a cellular network, the first notification to a client device operated by the first user.

(M15) A method may be performed as described in paragraph (M14), and may further involve receiving, by the computing system and from the client device over the control channel, a response to the first notification.

(M16) A method may be performed as described in paragraph (M15), and may further involve causing, by the computing system, the first data to be altered based at least in part on the response.

(M17) A method may be performed as described in any of paragraphs (M14) through paragraph (M16), and may further involve determining, by the computing system, to communicate the first notification to the client device over the control channel based at least in part on (A) an inability to establish a traffic channel between the client device and the cellular network, or (B) one or more attributes of an established traffic channel between the client device and the cellular network.

(M18) A method may be performed as described in paragraph (M17), wherein determining to communicate the first notification to the client device over the control channel is based at least in part on the inability to establish a traffic channel between the client device and the cellular network.

(M19) A method may be performed as described in paragraph (M17), wherein determining to communicate the first notification to the client device over the control channel is based at least in part on the one or more attributes of an established traffic channel between the client device and the cellular network.

(M20) A method may be performed as described in any of paragraphs (M14) through paragraph (M19), and may further involve accessing, by the computing system and using second access credentials of the custodian, second data associated with a second account; detecting, by the computing system, a change to the second data; generating, by the computing system, a second notification relating to the change to the second data; and sending, from the computing system to the client device, the second notification.

(M21) A method may be performed as described in any of paragraphs (M14) through paragraph (M20), wherein the computing system includes a short message service (SMS) gateway, and the method may further involve sending the first notification further comprises sending at least one SMS communication representing the first notification from the SMS gateway to the client device.

(M22) A method may be performed as described in paragraph (M21), wherein sending the at least one SMS communication may further involve determining a mobile telephone number that is stored by the computing system in a profile corresponding to the first user; and addressing the SMS communication to the mobile telephone number.

(M23) A method may be performed as described in any of paragraphs (M14) through paragraph (M22), wherein accessing the first data associated with the first account may further involve using the first access credentials to access the first data via an application programming interface (API) of the remote system of record.

The following paragraphs (S1) through (S23) describe examples of systems and devices that may be implemented in accordance with the present disclosure.

(S1) A system may include at least one processor and at least one computer readable medium encoded with instructions which, when executed by the at least one processor, cause the system to determine that a first message is to be sent to a client device, the first message being indicative of a first event of a remote application; to determine to communicate the first message to the client device over a control channel of a cellular network based at least in part on (A) an inability to establish a traffic channel between the client device and the cellular network, or (B) one or more attributes of an established traffic channel between the client device and the cellular network; to translate the first message into a format communicable to the client device over the control channel; and to send the first message to the client device over the control channel.

(S2) A system may be configured as described in paragraph (S1), and the at least one computer readable medium may be encoded with additional instructions which, when executed by the at least one processor, further cause the system to determine to communicate the first message to the client device over the control channel based at least in part on the inability to establish a traffic channel between the client device and the cellular network.

(S3) A system may be configured as described in paragraph (S1), and the at least one computer readable medium may be encoded with additional instructions which, when executed by the at least one processor, further cause the system to communicate the first message to the client device over the control channel based at least in part on the one or more attributes of an established traffic channel between the client device and the cellular network.

(S4) A system may be configured as described in any of paragraphs (S1) through (S3), and the at least one computer readable medium may be encoded with additional instructions which, when executed by the at least one processor, further cause the system to configure the first message to cause the client device to present an indication of at least a first action that can be taken with respect to the remote application to respond to the first event; to receive, over the control channel, a second message indicating that the first action is to be taken with respect to the remote application; and to cause, based at least in part on the second message, the first action to be taken with respect to the remote application.

(S5) A system may be configured as described in any of paragraphs (S1) through (S4), and the at least one computer readable medium may be encoded with additional instructions which, when executed by the at least one processor, further cause the system to store first access credentials that enable a user of the client device to access a first account associated with the remote application; to provide the first access credentials to the remote application to access first data associated with the first account; to detect a change to the first data; and to generate, based at least in part on the change to the first data, the first message to indicate the first event.

(S6) A system may be configured as described in paragraph (S5), and the at least one computer readable medium may be encoded with additional instructions which, when executed by the at least one processor, further cause the system to receive, from the client device over the control channel, a response to the first message; and to cause the first data to be altered based at least in part on the response.

(S7) A system may be configured as described in paragraph (S5) or paragraph (S6), and the at least one computer readable medium may be encoded with additional instructions which, when executed by the at least one processor, further cause the system to access the first data associated with the first account at least in part by using the first access credentials to access the first data via an application programming interface (API) of the remote application.

(S8) A system may be configured as described in any of paragraphs (S1) through (S7), wherein the system may further include a short message service (SMS) gateway, and the at least one computer readable medium may be encoded with additional instructions which, when executed by the at least one processor, further cause the system to send the first message to the client device at least in part by sending at least one SMS communication representing the first message from the SMS gateway to the client device.

(S9) A device may include at least one processor and at least one computer readable medium encoded with instructions which, when executed by the at least one processor, cause the device to detect a user input indicating an action that is to be taken with respect to a remote application; to determine that a first message is to be sent to a remote computing system, the first message indicating that the action is to be taken; to determine to communicate the first message to the remote computing system over a control channel of a cellular network based at least in part on (A) an inability to establish a traffic channel between the client device and the cellular network, or (B) one or more attributes of an established traffic channel between the client device and the cellular network; to translate the first message into a format communicable to the remote computing system over the control channel; and to send the first message to the remote computing system over the control channel.

(S10) A device may be configured as described in paragraph (S9), and the at least one computer readable medium may be encoded with additional instructions which, when executed by the at least one processor, further cause the device to determine to communicate the first message to the remote computing system over the control channel based at least in part on the inability to establish a traffic channel between the client device and the cellular network.

(S11) A device may be configured as described in paragraph (S9), and the at least one computer readable medium may be encoded with additional instructions which, when executed by the at least one processor, further cause the device to determine to communicate the first message to the remote computing system over the control channel based at least in part on the one or more attributes of an established traffic channel between the client device and the cellular network.

(S12) A device may be configured as described in paragraph (S9) or paragraph (S10), and the at least one computer readable medium may be encoded with additional instructions which, when executed by the at least one processor, further cause the device to receive, from the remote computing system, a second message indicative of a first event of a remote application; and to present, based at least in part on the second message, an indication to provide the user input to take the action to respond to the first event.

(S13) A device may be configured as described in any of paragraphs (S9) through paragraph (S12), and the at least one computer readable medium may be encoded with additional instructions which, when executed by the at least one processor, further cause the device to send the first message to the remote computing system at least in part by sending at least one short message service (SMS) communication representing the first message to the remote computing system.

(S14) A system may include at least one processor and at least one computer readable medium encoded with instructions which, when executed by the at least one processor, cause the system to store first access credentials that enable a first user to access a first account maintained by a remote system of record; to provide the first access credentials to the remote system of record to access first data associated with the first account; to detect a change to the first data; to generate a first notification relating to the change to the first data; and to send the first notification over a control channel of a cellular network to a client device operated by the first user.

(S15) A system may be configured as described in paragraph (S14), and the at least one computer readable medium may be encoded with additional instructions which, when executed by the at least one processor, further cause the system to receive, from the client device and over the control channel, a response to the first notification.

(S16) A system may be configured as described in paragraph (S15), and the at least one computer readable medium may be encoded with additional instructions which, when executed by the at least one processor, further cause the system to cause the first data to be altered based at least in part on the response.

(S17) A system may be configured as described in any of paragraphs (S14) through paragraph (S16), and the at least one computer readable medium may be encoded with additional instructions which, when executed by the at least one processor, further cause the system to determine to communicate the first notification to the client device over the control channel based at least in part on (A) an inability to establish a traffic channel between the client device and the cellular network, or (B) one or more attributes of an established traffic channel between the client device and the cellular network.

(S18) A system may be configured as described in paragraph (S17), and the at least one computer readable medium may be encoded with additional instructions which, when executed by the at least one processor, further cause the system to determine to communicate the first notification to the client device over the control channel based at least in part on the inability to establish a traffic channel between the client device and the cellular network.

(S19) A system may be configured as described in paragraph (S17), and the at least one computer readable medium may be encoded with additional instructions which, when executed by the at least one processor, further cause the system to determine to communicate the first notification to the client device over the control channel based at least in part on the one or more attributes of an established traffic channel between the client device and the cellular network.

(S20) A system may be configured as described in any of paragraphs (S14) through paragraph (S19), and the at least one computer readable medium may be encoded with additional instructions which, when executed by the at least one processor, further cause the system to access, using second access credentials of the custodian, second data associated with a second account; to detect a change to the second data; to generate a second notification relating to the change to the second data; and to send, to the client device, the second notification.

(S21) A system may be configured as described in any of paragraphs (S14) through paragraph (S20), wherein the system may further include a short message service (SMS) gateway, and the at least one computer readable medium may be encoded with additional instructions which, when executed by the at least one processor, further cause the system to send the first notification to the client device at least in part by sending at least one SMS communication representing the first notification from the SMS gateway to the client device.

(S22) A system may be configured as described in paragraph (S21), and the at least one computer readable medium may be encoded with additional instructions which, when executed by the at least one processor, further cause the system to determine a mobile telephone number that is stored by the computing system in a profile corresponding to the first user; and to address the SMS communication to the mobile telephone number.

(S23) A system may be configured as described in any of paragraphs (S14) through paragraph (S22), and the at least one computer readable medium may be encoded with additional instructions which, when executed by the at least one processor, further cause the system to access the first data associated with the first account at least in part by using the first access credentials to access the first data via an application programming interface (API) of the remote system of record.

The following paragraphs (CRM1) through (CRM23) describe examples of computer-readable media that may be implemented in accordance with the present disclosure.

(CRM1) At least one computer readable medium may be encoded with instructions which, when executed by the at least one processor of a system, cause the system to determine that a first message is to be sent to a client device, the first message being indicative of a first event of a remote application; to determine to communicate the first message to the client device over a control channel of a cellular network based at least in part on (A) an inability to establish a traffic channel between the client device and the cellular network, or (B) one or more attributes of an established traffic channel between the client device and the cellular network; to translate the first message into a format communicable to the client device over the control channel; and to send the first message to the client device over the control channel.

(CRM2) At least one computer readable medium may be configured as described in paragraph (CRM1), and the at least one computer readable medium may be encoded with additional instructions which, when executed by the at least one processor, further cause the system to determine to communicate the first message to the client device over the control channel based at least in part on the inability to establish a traffic channel between the client device and the cellular network.

(CRM3) At least one computer readable medium may be configured as described in paragraph (CRM1), and may be encoded with additional instructions which, when executed by the at least one processor, further cause the system to communicate the first message to the client device over the control channel based at least in part on the one or more attributes of an established traffic channel between the client device and the cellular network.

(CRM4) At least one computer readable medium may be configured as described in any of paragraphs (CRM1) through (CRM3), and may be encoded with additional instructions which, when executed by the at least one processor, further cause the system to configure the first message to cause the client device to present an indication of at least a first action that can be taken with respect to the remote application to respond to the first event; to receive, over the control channel, a second message indicating that the first action is to be taken with respect to the remote application; and to cause, based at least in part on the second message, the first action to be taken with respect to the remote application.

(CRM5) At least one computer readable medium may be configured as described in any of paragraphs (CRM1) through (CRM4), and may be encoded with additional instructions which, when executed by the at least one processor, further cause the system to store first access credentials that enable a user of the client device to access a first account associated with the remote application; to provide the first access credentials to the remote application to access first data associated with the first account; to detect a change to the first data; and to generate, based at least in part on the change to the first data, the first message to indicate the first event.

(CRM6) At least one computer readable medium may be configured as described in paragraph (CRM5), and may be encoded with additional instructions which, when executed by the at least one processor, further cause the system to receive, from the client device over the control channel, a response to the first message; and to cause the first data to be altered based at least in part on the response.

(CRM7) At least one computer readable medium may be configured as described in paragraph (CRM5) or paragraph (CRM6), and may be encoded with additional instructions which, when executed by the at least one processor, further cause the system to access the first data associated with the first account at least in part by using the first access credentials to access the first data via an application programming interface (API) of the remote application.

(CRM8) At least one computer readable medium may be configured as described in any of paragraphs (CRM1) through (CRM7), and may be encoded with additional instructions which, when executed by the at least one processor, further cause the system to send the first message to the client device at least in part by sending at least one SMS communication representing the first message from an SMS gateway to the client device.

(CRM9) At least one computer readable medium may be encoded with instructions which, when executed by the at least one processor of a device, cause the device to detect a user input indicating an action that is to be taken with respect to a remote application; to determine that a first message is to be sent to a remote computing system, the first message indicating that the action is to be taken; to determine to communicate the first message to the remote computing system over a control channel of a cellular network based at least in part on (A) an inability to establish a traffic channel between the client device and the cellular network, or (B) one or more attributes of an established traffic channel between the client device and the cellular network; to translate the first message into a format communicable to the remote computing system over the control channel; and to send the first message to the remote computing system over the control channel.

(CRM10) A device may be configured as described in paragraph (CRM9), and may be encoded with additional instructions which, when executed by the at least one processor, further cause the device to determine to communicate the first message to the remote computing system over the control channel based at least in part on the inability to establish a traffic channel between the client device and the cellular network.

(CRM11) A device may be configured as described in paragraph (CRM9), and may be encoded with additional instructions which, when executed by the at least one processor, further cause the device to determine to communicate the first message to the remote computing system over the control channel based at least in part on the one or more attributes of an established traffic channel between the client device and the cellular network.

(CRM12) A device may be configured as described in paragraph (CRM9) or paragraph (CRM10), and may be encoded with additional instructions which, when executed by the at least one processor, further cause the device to receive, from the remote computing system, a second message indicative of a first event of a remote application; and to present, based at least in part on the second message, an indication to provide the user input to take the action to respond to the first event.

(CRM13) A device may be configured as described in any of paragraphs (CRM9) through paragraph (CRM12), and may be encoded with additional instructions which, when executed by the at least one processor, further cause the device to send the first message to the remote computing system at least in part by sending at least one short message service (CRMMS) communication representing the first message to the remote computing system.

(CRM14) At least one computer readable medium may be encoded with instructions which, when executed by the at least one processor of a system, cause the system to store first access credentials that enable a first user to access a first account maintained by a remote system of record; to provide the first access credentials to the remote system of record to access first data associated with the first account; to detect a change to the first data; to generate a first notification relating to the change to the first data; and to send the first notification over a control channel of a cellular network to a client device operated by the first user.

(CRM15) At least one computer readable medium may be configured as described in paragraph (CRM14), and may be encoded with additional instructions which, when executed by the at least one processor, further cause the system to receive, from the client device and over the control channel, a response to the first notification.

(CRM16) At least one computer readable medium may be configured as described in paragraph (CRM15), and may be encoded with additional instructions which, when executed by the at least one processor, further cause the system to cause the first data to be altered based at least in part on the response.

(CRM17) At least one computer readable medium may be configured as described in any of paragraphs (CRM14) through paragraph (CRM16), and may be encoded with additional instructions which, when executed by the at least one processor, further cause the system to determine to communicate the first notification to the client device over the control channel based at least in part on (A) an inability to establish a traffic channel between the client device and the cellular network, or (B) one or more attributes of an established traffic channel between the client device and the cellular network.

(CRM18) At least one computer readable medium may be configured as described in paragraph (CRM17), and may be encoded with additional instructions which, when executed by the at least one processor, further cause the system to determine to communicate the first notification to the client device over the control channel based at least in part on the inability to establish a traffic channel between the client device and the cellular network.

(CRM19) At least one computer readable medium may be configured as described in paragraph (CRM17), and may be encoded with additional instructions which, when executed by the at least one processor, further cause the system to determine to communicate the first notification to the client device over the control channel based at least in part on the one or more attributes of an established traffic channel between the client device and the cellular network.

(CRM20) At least one computer readable medium may be configured as described in any of paragraphs (CRM14) through paragraph (CRM19), and may be encoded with additional instructions which, when executed by the at least one processor, further cause the system to access, using second access credentials of the custodian, second data associated with a second account; to detect a change to the second data; to generate a second notification relating to the change to the second data; and to send, to the client device, the second notification.

(CRM21) At least one computer readable medium may be configured as described in any of paragraphs (CRM14) through paragraph (CRM20), and the at least one computer readable medium may be encoded with additional instructions which, when executed by the at least one processor, further cause the system to send the first notification to the client device at least in part by sending at least one SMS communication representing the first notification from an SMS gateway to the client device.

(CRM22) At least one computer readable medium may be configured as described in paragraph (CRM21), and may be encoded with additional instructions which, when executed by the at least one processor, further cause the system to determine a mobile telephone number that is stored by the computing system in a profile corresponding to the first user; and to address the SMS communication to the mobile telephone number.

(CRM23) At least one computer readable medium may be configured as described in any of paragraphs (CRM14) through paragraph (CRM22), and may be encoded with additional instructions which, when executed by the at least one processor, further cause the system to access the first data associated with the first account at least in part by using the first access credentials to access the first data via an application programming interface (API) of the remote system of record.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
    determining, by a computing system, to communicate a first message to a device over a control channel of a cellular network based at least in part on (A) an inability to establish a traffic channel between the device and the cellular network, or (B) one or more attributes of an established traffic channel between the device and the cellular network;
    translating, by the computing system, the first message into a format communicable to the device over the control channel; and
    sending, by the computing system, the first message to the device over the control channel.

2. The method of claim 1, wherein determining to communicate the first message to the device over the control channel is based at least in part on the inability to establish a traffic channel between the device and the cellular network.

3. The method of claim 1, wherein determining to communicate the first message to the device over the control channel is based at least in part on the one or more attributes of an established traffic channel between the device and the cellular network.

4. The method of claim 1, further comprising:
    configuring the first message to cause the device to present an indication of at least a first action that can be taken with respect to an application;
    receiving, by the computing system and over the control channel, a second message indicating that the first action is to be taken with respect to the application; and
    causing, by the computing system and based at least in part on the second message, the first action to be taken with respect to the application.

5. The method of claim 1, further comprising:
    storing, by the computing system, first access credentials that enable a user of the device to access a first account associated with an application;
    providing, by the computing system, the first access credentials to the application to access first data associated with the first account;
    detecting, by the computing system, a first event indicated by a change to the first data; and
    generating, by the computing system and based at least in part on the change to the first data, the first message to indicate the first event.

6. The method of claim 5, further comprising:
    receiving, by the computing system and from the device over the control channel, a response to the first message; and
    causing, by the computing system, the first data to be altered based at least in part on the response.

7. The method of claim 5, wherein accessing the first data associated with the first account further comprises using the first access credentials to access the first data via an application programming interface (API) of the application.

8. The method of claim 1, wherein:
    the computing system includes a short message service (SMS) gateway; and
    sending the first message further comprises sending at least one SMS communication representing the first message from the SMS gateway to the device.

9. A method, comprising:
    determining, by a device, to communicate a first message to a computing system over a control channel of a cellular network based at least in part on (A) an inability to establish a traffic channel between the device and the cellular network, or (B) one or more attributes of an established traffic channel between the device and the cellular network;

translating, by the device, the first message into a format communicable to the computing system over the control channel; and sending, by the device, the first message to the computing system over the control channel.

10. The method of claim 9, wherein determining to communicate the first message to the computing system over the control channel is based at least in part on the inability to establish a traffic channel between the device and the cellular network.

11. The method of claim 9, wherein determining to communicate the first message to the computing system over the control channel is based at least in part on the one or more attributes of an established traffic channel between the device and the cellular network.

12. The method of claim 9, further comprising:
receiving, by the device and from the computing system, a second message indicative of a first event of an application; and
presenting, by the device and based at least in part on the second message, an indication to provide a user input to take an action to respond to the first event.

13. The method of claim 9, wherein:
sending the first message further comprises sending at least one short message service (SMS) communication representing the first message to the computing system.

14. A system, comprising:
at least one processor; and
at least one non-transitory computer-readable medium encoded with instructions which, when executed by the at least one processor, cause the system to:
determine to communicate a first message a device over a control channel of a cellular network based at least in part on (A) an inability to establish a traffic channel between the device and the cellular network, or (B) one or more attributes of an established traffic channel between the device and the cellular network,
translate the first message into a format communicable to the device over the control channel, and
send the first message to the device over the control channel.

15. The system of claim 14, wherein the at least one non-transitory computer-readable medium is further encoded with additional instructions which, when executed by the at least one processor, further cause the system to:
determine to communicate the first message to the device over the control channel based at least in part on the inability to establish a traffic channel between the device and the cellular network.

16. The system of claim 14, wherein the at least one non-transitory computer-readable medium is further encoded with additional instructions which, when executed by the at least one processor, further cause the system to:
determine to communicate the first message to the device over the control channel based at least in part on the one or more attributes of an established traffic channel between the device and the cellular network.

17. The system of claim 14, wherein the at least one non-transitory computer-readable medium is further encoded with additional instructions which, when executed by the at least one processor, further cause the system to:
configure the first message to cause the device to present an indication of at least a first action that can be taken with respect to an application;
receive, over the control channel, a second message indicating that the first action is to be taken with respect to the application; and
cause, based at least in part on the second message, the first action to be taken with respect to the application.

18. The system of claim 14, further comprising a storage medium, and wherein the at least one non-transitory computer-readable medium is further encoded with additional instructions which, when executed by the at least one processor, further cause the system to:
identify, in the storage medium, first access credentials that enable a user of the device to access a first account associated with an application;
provide the first access credentials to the application to access first data associated with the first account;
detect a first event indicated by a change to the first data; and
generate, based at least in part on the change to the first data, the first message to indicate the first event.

19. The system of claim 18, further comprising a storage medium, and wherein the at least one non-transitory computer-readable medium is further encoded with additional instructions which, when executed by the at least one processor, further cause the system to:
access the first data associated with the first account at least in part by using the first access credentials to access the first data via an application programming interface (API) of the application.

20. The system of claim 14, further comprising a short message service (SMS) gateway, and wherein the at least one non-transitory computer-readable medium is further encoded with additional instructions which, when executed by the at least one processor, further cause the system to:
send the first message to the device at least in part by sending at least one SMS communication representing the first message from the SMS gateway to the device.

* * * * *